United States Patent
Laine et al.

(10) Patent No.: US 6,687,796 B1
(45) Date of Patent: Feb. 3, 2004

(54) MULTI-CHANNEL DMA WITH REQUEST SCHEDULING

(75) Inventors: Armelle Laine, Antibes (FR); Daniel Mazzocco, Le Rouret (FR); Gerald Ollivier, Vence (FR); Laurent Six, Bar sur Loup (FR)

(73) Assignee: Texas Instruments Incorporated, Dallas, TX (US)

( * ) Notice: Subject to any disclaimer, the term of this patent is extended or adjusted under 35 U.S.C. 154(b) by 481 days.

(21) Appl. No.: 09/591,623

(22) Filed: Jun. 9, 2000

(30) Foreign Application Priority Data

Jun. 9, 1999 (EP) ............................................. 99401387

(51) Int. Cl.⁷ ............................................. G06F 12/06
(52) U.S. Cl. ........................ 711/149; 711/189; 710/22; 710/39; 710/38
(58) Field of Search ............................ 711/4, 114, 112, 711/149, 151, 152, 167, 169; 370/416; 375/222; 710/22, 39, 38

(56) References Cited

U.S. PATENT DOCUMENTS

| | | | | |
|---|---|---|---|---|
| 4,933,846 A | * | 6/1990 | Humphrey et al. | 710/107 |
| 4,991,169 A | * | 2/1991 | Davis et al. | 370/463 |
| 5,440,716 A | * | 8/1995 | Schultz et al. | 711/114 |
| 5,598,575 A | * | 1/1997 | Dent et al. | 710/28 |
| 5,642,349 A | * | 6/1997 | Cloonan et al. | 370/360 |
| 6,076,139 A | * | 6/2000 | Welker et al. | 711/104 |
| 6,141,376 A | * | 10/2000 | Shaw | 375/222 |
| 6,167,486 A | * | 12/2000 | Lee et al. | 711/120 |
| 6,477,174 B1 | * | 11/2002 | Dooley et al. | 370/416 |
| 6,505,268 B1 | * | 1/2003 | Schultz et al. | 711/4 |

FOREIGN PATENT DOCUMENTS

| | | | | |
|---|---|---|---|---|
| EP | 2334651 A | * | 8/1999 | |
| EP | 0 940946 A1 | * | 9/1999 | |
| JP | 63128820 | | 11/1986 | .......... H03M/13/22 |
| JP | 09045072 | | 7/1995 | ............ G11C/7/00 |
| WO | WO 98 43176 A | | 3/1998 | ........... G06F/13/16 |

* cited by examiner

Primary Examiner—Pierre Michel Bataille
(74) Attorney, Agent, or Firm—Robert D. Marshall, Jr.; W. James Brady, III; Frederick J. Telecky, Jr.

(57) ABSTRACT

A digital system is provided with a multi-channel DMA controller (400) for transferring data between various resources (401, 402). Each channel includes a source port (460–461), a channel controller (410–412) and a destination port (460, 461). Channel to port buses (CP0-CP2) are representative of parallel buses that are included in the read address bus (RA). Similar parallel buses are provided for a write address bus and a data output bus, not shown. Port to channel buses (PC0-PC1) are representative of parallel buses that are included in data input bus DI. Scheduling circuitry (420, 421) includes request allocator circuitry, interleaver circuitry and multiplexer circuitry and selects one of the channel to port buses to be connected to an associated port controller (460, 461) on each clock cycle for providing an address for a transaction performed on each clock cycle. The schedulers operate in parallel and source/destination channel addresses are transferred in parallel to each scheduler via the parallel channel to port buses. Input/output data words are also transferred in parallel to/from each port. Each port is tailored to provide an access protocol required by its associated resource. The ports may be tailored to provide an access protocol required by a different type of resource. Channel and scheduling circuitry within a sub-portion (400a) of the DMA controller can interact with various versions of tailored ports without being modified.

16 Claims, 14 Drawing Sheets

| 15 | 14 | 13 | 12 | 11 | 6 | 5 | 0 |
|---|---|---|---|---|---|---|---|
| FREE | CPU/DMA | EHPI | | PRIO[5:0] | | DE[5:0] | |

| 15 | 14 | 13 | 12 | 11 | 10 | 9 | 8 | 7 | 6 | 5 | 4 | 0 |
|---|---|---|---|---|---|---|---|---|---|---|---|---|
| WDBRT[1:0] | | SIND[1:0] | | SRC[1:0] | | DIND[1:0] | | DST[1:0] | | FS | DSYN[4:0] | |

| 15 | 0 |
|---|---|
| ELEMENT COUNT | |

| | $t_0$ | $t_1$ | $t_2$ | $t_3$ | $t_4$ | $t_5$ | $t_6$ | $t_7$ | $t_8$ | $t_9$ | $t_{10}$ | $T_{11}$ | $T_{12}$ | $T_{13}$ |
|---|---|---|---|---|---|---|---|---|---|---|---|---|---|---|
| r_a0 | a1 | a2 | a3 | a4 | a5 | e | | | | | | | | |
| r_a1 | a0 | a1 | a2 | a3 | a4 | a5 | e | | | | | | | |
| r_a2 | | a0 | a1 | a2 | a3 | a4 | a5 | | | | | | | |
| r_a3 | | | a0 | a1 | a2 | a3 | a4 | a5 | | | | | | |
| r_sa3 | | | | | | | | | | | | | | |
| r_aout | | | | a0 | a1 | a2 | a3 | a4 | a5 | | | | | |
| w_a0 | a1 | a2 | a3 | is | is | is | is | a4 | a5 | e | | | | |
| w_a1 | a0 | a1 | a2 | is | is | is | is | a3 | a4 | a5 | e | | | |
| w_a2 | | a0 | a1 | is | is | is | is | a2 | a3 | a4 | a5 | | | |
| w_a3 | | | a0 | is | is | is | is | a1 | a2 | a3 | a4 | a5 | | |
| w_sa3 | | | | | | | | | | | | | | |
| w_aout | | | | | | a0 | a1 | a2 | a3 | a4 | a5 | | | |
| r_rdy | 0 | 1 | 1 | 1 | 1 | 1 | 1 | 0 | | | | | | |
| r_inter | | | a0 | a1 | a2 | a3 | a4 | a5 | | | | | | |
| r_sinter | | | | | | | | | | | | | | |
| r_req | | | | a0 | a1 | a2 | a3 | a4 | a5 | | | | | |
| r_ack | | | | | a0 | a1 | a2 | a3 | a4 | a5 | | | | |
| w_rdy | 0 | 0 | 0 | 0 | 0 | 1 | 1 | 1 | 1 | 1 | 1 | 0 | | |
| w_inter | | | | | | | | a0 | a1 | a2 | a3 | a4 | a5 | |
| w_sinter | | | | | | | | | | | | | | |
| w_req | | | | | | | | a0 | a1 | a2 | a3 | a4 | a5 | |
| w_ack | | | | | | | | | a0 | a1 | a2 | a3 | a4 | a5 |
| w_com | | | + | + | + | + | + | + | − | − | − | − | − | − |
| nw_cnt | 0 | 0 | 1 | 2 | 3 | 4 | 5 | 6 | 5 | 4 | 3 | 2 | 1 | 0 |
| r_com | | | | + | + | +− | +− | +− | +− | − | − | | | |
| nr_cnt | 0 | 0 | 0 | 0 | 1 | 2 | 2 | 2 | 2 | 2 | 1 | 0 | | |
| FIFO 7 | | | | | | | | | | | | | | |
| FIFO 6 | | | | | | | | | | | | | | |
| FIFO 5 | | | | | | | | | | | | | | |
| FIFO 4 | | | | | | | | | | | | | | |
| FIFO 3 | | | | | | | | | a3 | a4 | a5 | | | |
| FIFO 2 | | | | | | | | a2 | a2 | a3 | a4 | a5 | | |
| FIFO 1 | | | | | | | a1 | a1 | a1 | a2 | a3 | a4 | a5 | |
| FIFO 0 | | | | | | a0 | a0 | a0 | a0 | a1 | a2 | a3 | a4 | a5 |

*FIG. 16*

MULTI-CHANNEL DMA WITH REQUEST SCHEDULING

CROSS REFERENCE TO RELATED APPLICATIONS

This application claims priority to S.N. 99401387.8, filed in Europe on Jun. 9, 1999.

This application is related to co-assigned U.S. patent applications Ser. No. 09/591,076, Ser. No. 09/591,615; and Ser. No. 09/591,535, co-filed contemporaneously herewith and incorporated herein by reference.

TECHNICAL FIELD OF THE INVENTION

This invention generally relates to microprocessors, and more specifically to improvements in direct memory access circuits, systems, and methods of making.

BACKGROUND OF THE INVENTION

Microprocessors are general purpose processors which provide high instruction throughputs in order to execute software running thereon, and can have a wide range of processing requirements depending on the particular software applications involved. A direct memory access (DMA) controller is often associated with a processor in order to take over the burden of transferring blocks of data from one memory or peripheral resource to another and to thereby improve the performance of the processor.

Many different types of processors are known, of which microprocessors are but one example. For example, Digital Signal Processors (DSPs) are widely used, in particular for specific applications, such as mobile processing applications. DSPs are typically configured to optimize the performance of the applications concerned and to achieve this they employ more specialized execution units and instruction sets. Particularly in applications such as mobile telecommunications, but not exclusively, it is desirable to provide ever increasing DSP performance while keeping power consumption as low as possible.

SUMMARY OF THE INVENTION

Particular and preferred aspects of the invention are set out in the accompanying independent and dependent claims. Combinations of features from the dependent claims may be combined with features of the independent claims as appropriate and not merely as explicitly set out in the claims. The present invention is directed to improving the performance of digital systems with processors, such as for example, but not exclusively, digital signal processors.

In accordance with a first aspect of the invention, there is provided a digital system with a plurality of requestor circuits each having at least one request address output node for providing a request address and at least one request output. A port circuit has a request address input node connected to the request address output nodes of the plurality of requestor circuits, a memory address output node for providing a memory address selected from the plurality of request address output nodes to a respective associated memory resource, and a scheduler circuit operable to select the next request that will be served by the port. The scheduler circuit comprises an allocation circuit with a plurality of request inputs each connected to a respective request output on the plurality of requester circuits, and a request output for providing a subset of request signals selected from the plurality of request inputs; and an interleaver circuit with a request input connected to the request output of the allocation circuit, the interleaver circuit operable to select the next request from among the subset of request signals that will be served next by the port circuit.

In accordance with another aspect of the present invention, the interleaver circuit comprises a request allocation table memory circuit connected to the request input and the allocation circuit is operable to store the subset of request signals in the request allocation table.

In accordance with another aspect of the present invention, the interleaver circuit has a number selector circuits which each have a control input connected to the request allocation table memory circuit. Each of the selector circuits has a plurality of status inputs connected to receive a status signal from each requestor circuit. Each selector circuit has an output to provide the selected status signal.

In accordance with another aspect of the present invention, a method of operating a digital system having a memory resource and a plurality of requestor circuits which each require access to the memory resource is provided. A subset of requests from the requestor circuits are allocated and stored in a request allocation table. The subset of requests from the request allocation table are interleaved to determine the next request that will be presented to the memory resource.

According to another aspect of the present invention, the step of interleaving includes evaluating a ready status of each request in the request allocation table and ignoring a request that is not ready.

According to another aspect of the present invention the step of allocating includes selecting the subset of requests from the plurality of requestor circuits based on a priority assigned to each requestor circuit. A request from a requestor is removed from the request allocation table if a request is received from a second requestor having a higher priority than the first requestor.

DESCRIPTION OF THE DRAWINGS

Particular embodiments in accordance with the invention will now be described, by way of example only, and with reference to the accompanying drawings in which like reference signs are used to denote like parts and in which the Figures relate to the digital system of FIG. 1 and the DMA controller of FIG. 2, unless otherwise stated, and in which:

FIG. 16 is a timing diagram illustrating a transfer of six words from the SARAM port to the RHEA port;

Corresponding numerals and symbols in the different figures and tables refer to corresponding parts unless otherwise indicated.

DETAILED DESCRIPTION OF THE INVENTION

Although the invention finds particular application to Digital Signal Processors (DSPs), implemented, for example, in an Application Specific Integrated Circuit (ASIC), it also finds application to other forms of processors. An ASIC may contain one or more megacells which each include custom designed functional circuits combined with pre-designed functional circuits provided by a design library.

Figure 1:
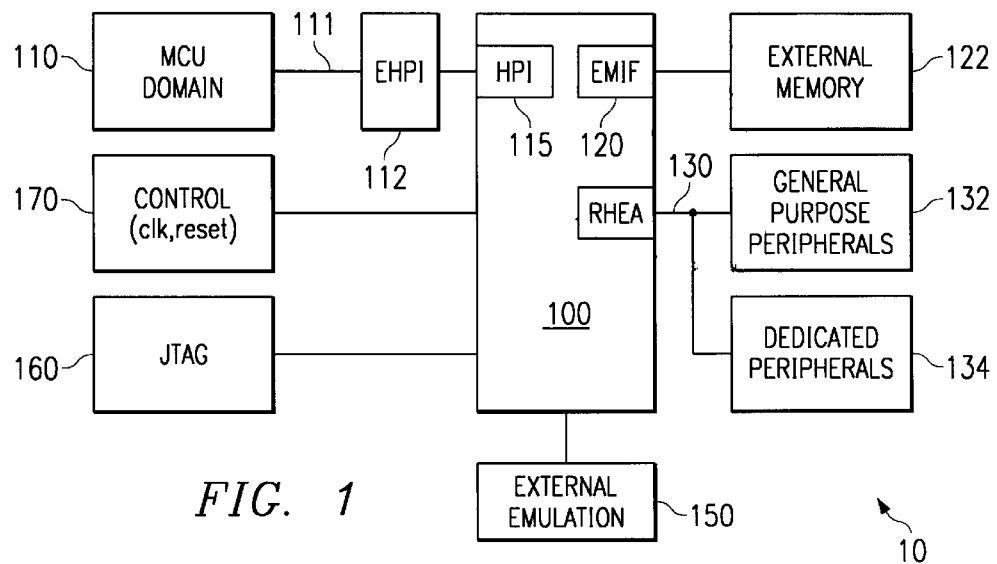
FIG. 1 is a block diagram of a digital system that includes an embodiment of the present invention.

FIG. 1 is a block diagram of a digital system that includes an embodiment of the present invention. Megacell 100 includes a CPU, DMA controller and memory circuits, and will be described in greater detail later. Host processor 110 is connected to megacell 100 via enhanced host port interface (EHPI) 112. EHPI 112 provides multiplexing of the host address and data bus 111 to match the host port interface 115 provided by megacell 100. Memory 122, general purpose peripherals 132 and dedicated peripherals 134 can be accessed by host processor 110 or the CPU within megacell 100. Control circuitry 170 provides timing signals for circuitry within megacell 100. MCU 110 includes its own timing circuitry, which requires that accesses by MCU 110 to resources controlled by megacell 100 must be synchronized to the time base of megacell 100.

JTAG test port 160 contains hardware extensions for advanced debugging features. These assist in the user's development of the application system (software and the hardware) utilizing only the JTAG interface, a test access port and boundary-scan architecture defined by the IEEE 1149.1 standard with extended operating mode enhancements, as described in U.S. Pat. No. 5,828,824. Emulation circuitry 150 provides debug program control and execution tracing facilities.

Figure 2:
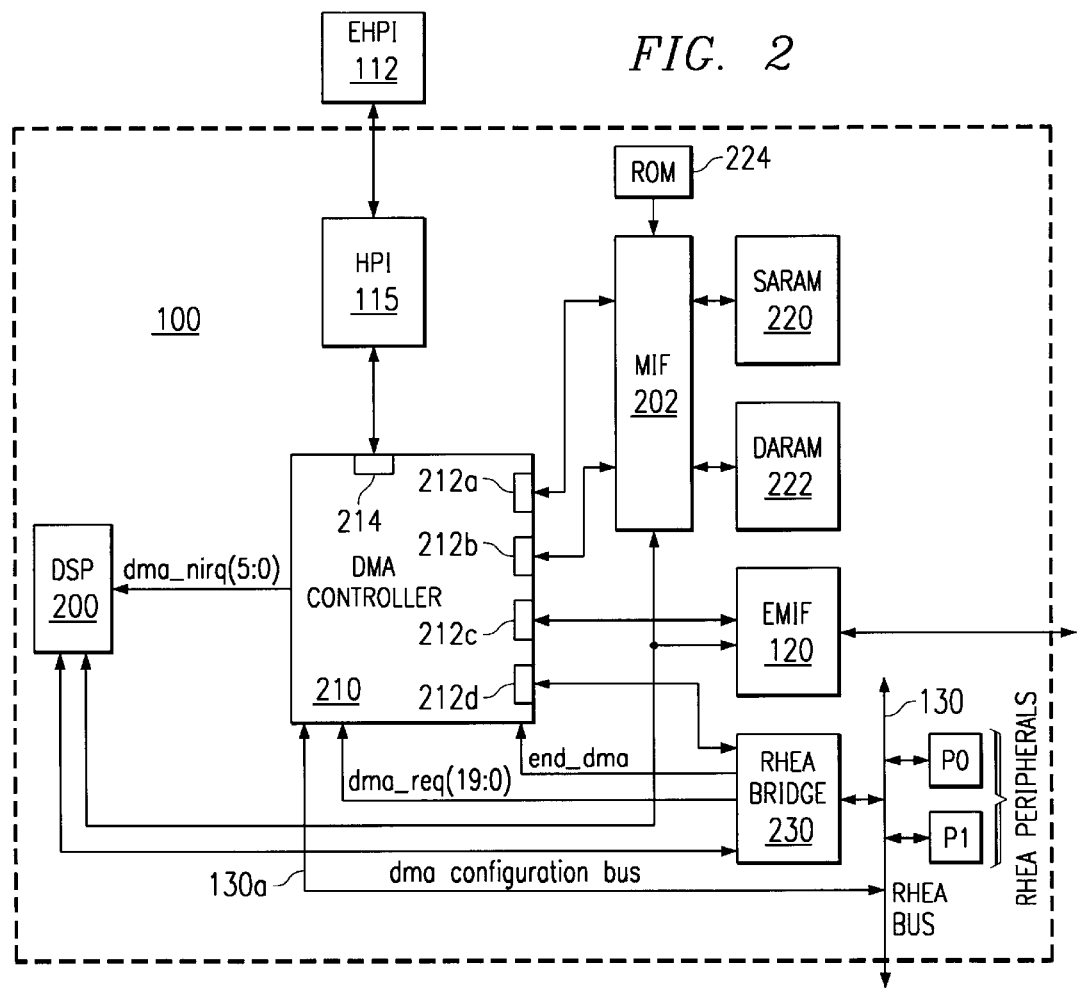
FIG. 2 is a more detailed block diagram of a megacell from FIG. 1.

FIG. 2 is a more detailed block diagram of megacell 100. CPU 200 is a digital signal processor (DSP). CPU 200 accesses memory circuits 220, 222 and 224 via memory interface circuitry 202. CPU 200 accesses external memory via external memory interface (EMIF) 120. CPU 200 access other resources via RHEA bridge 230 to RHEA bus 130. According to an aspect of the present invention, DMA controller 210 is a multi-channel DMA controller with separate channel and port controllers with each port having local scheduling circuitry. DMA 210 can be programmed to transfer data between various sources and destinations within digital system 10, such as single access RAM 220, dual access RAM 222, external memory 122 via external memory interface 120, and peripheral devices on resource bus (RHEA) 130 via RHEA bridge 230. MCU 110 can also access these resources via host port interface (HPI) 115 which is connected to DMA controller 210. The path between the HPI port and the Memory is a DMA channel.

Memory circuit 220 is a 128 K×16 Single Access RAM (SARAM), comprising sixteen 32 K byte modules. DMA 210 can access the SARAM by a 16 bit DMA bus. The DMA bus access (R/W) can be in SAM (Shared access mode) or in HOM mode (Host only mode). An access by MCU 110 in HOM mode will bypass synchronization circuitry within DMA 210 that synchronizes MCU timing to megacell 100 timing. The priority scheme between CPU 200 and DMA 210 is programmable. The priority circuitry is. implemented in the SARAM, whereas the control register is located in the DMA IO space accessible via RHEA bus branch 130a.

Memory circuit 222 is a 32 K×16 Dual Access RAM (DARAM) comprising four 16 K byte modules. CPU 200 can perform two accesses to one DARAM memory module in one cycle; for example, a single read and single write, or a long read and a long write, a dual read and a single write etc. The priorities assigned to the different accesses are handled by the DARAM. The priority scheme between CPU and DMA is programmable. The priority circuitry is implemented in the DARAM, whereas the control register is located in the DMA IO space accessible via the RHEA bus.

Another embodiment of the present invention may have different configurations of memory and peripherals.

FIG. 2 only shows those portions of megacell 100 that are relevant to an understanding of an embodiment of the present invention. Details of general construction for DSPs are well known, and may be found readily elsewhere. For example, U.S. Pat. No. 5,072,418 issued to Frederick Boutaud, et al, describes a DSP in detail and is incorporated herein by reference. U.S. Pat. No. 5,329,471 issued to Gary Swoboda, et al, describes in detail how to test and emulate a DSP and is incorporated herein by reference. Details of portions of DMA controller 210 relevant to an embodiment of the present invention are explained in sufficient detail hereinbelow, so as to enable one of ordinary skill in the microprocessor art to make and use the invention.

Table 1 summarizes several of the acronyms used throughout this document.

TABLE 1

| Glossary of Terms | |
|---|---|
| DMA | Direct Memory Access |
| MIF | Memory Interface |
| EMIF | External Memory Interface |
| HPI | Host Port Interface |
| RHEA | Resource access bus, for peripheral devices and memory mapped register access |
| SARAM | Single Access RAM |
| DARAM | Dual Access RAM |
| PDROM | Program and Data ROM |

TABLE 1-continued

Glossary of Terms

| | |
|---|---|
| HOM_M | Host Only Mode Memory |
| SAM_M | Share Access Mode Memory |
| HOM_R | Host Only Mode RHEA |
| SAM_R | Share Access Mode RHEA |
| DSP | Digital Signal Processor |
| CPU | a microprocessor within a megacell on an integrated circuit (IC), such as a DSP. |
| MCU | a second processor that interacts with the CPU, may act as a master, or host, processor |
| EHPI | Enhanced Host Port Interface. |
| Element | the atomic unit of data transferred by the DMA. An element can be a word, 2 words, a burst of 4 words, or a burst of 8 words. |
| Frame | set of elements. |
| FIFO | first in, first out buffer |

DMA controller 210 transfers data between points in the memory space without intervention by the CPU. The DMA allows movements of data to and from internal memory, external memory and peripherals to occur in background of CPU operation. The DMA has six independent programmable channels allowing six different contexts for DMA operation, executed in Time Division Multiplexed (TDM) mode.

The DMA architecture is organized around ports and channels. Referring still to FIG. 2, each resource the DMA can access has its own port: SARAM port 212a, DARAM port 212b, EMIF port 212c, and RHEA port 212d. HPI port 214 is a special case, which will be discussed later. A port can make read and write accesses to the resource it is connected, through a dedicated bus.

This DMA controller meets the need of high rate flow and multi-channel applications such as wireless telephone base stations or cellular handset data traffic.

Figure 3A:
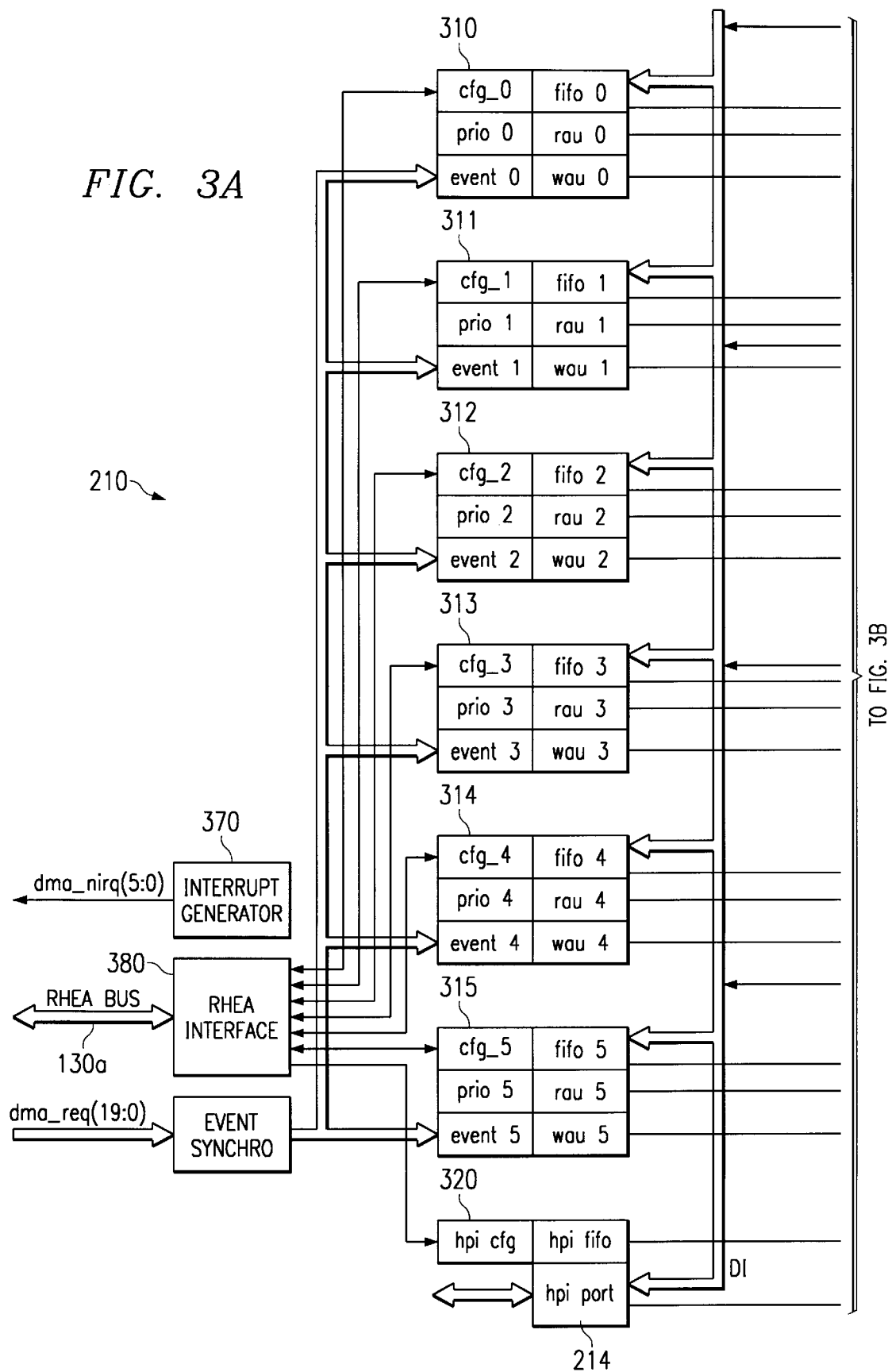
FIG. 3 is a detailed block diagram of the DMA controller of FIG. 2.
Figure 3B:
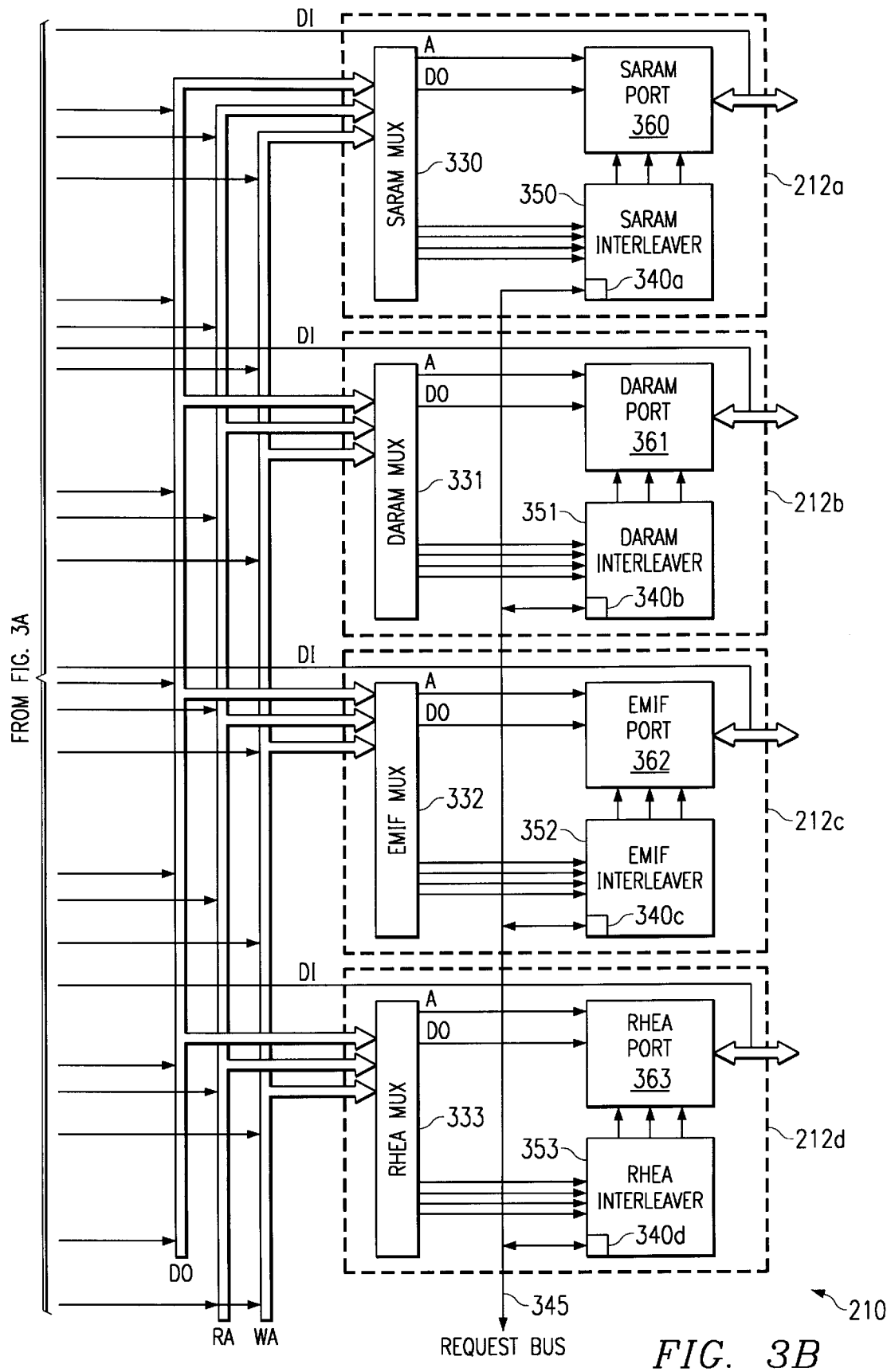

FIG. 3 is a detailed block diagram of the DMA controller of FIG. 2. A channel includes a source port, a FIFO and a destination port, and the source port and destination port of each channel is dynamically programmable. Six channels are available in the present embodiment, although other embodiments may have alternate numbers of channels. Six channel controllers 310–315 control the six channels. All six channels are multiplexed on each port via respective port multiplexers 330–333. Each channel control has a respective FIFO(n). The FIFOs aren't shared by the channels; each channel has its own FIFO. This allows more independence between transfers. A DMA transfer in channel (n) is made in two steps: the source port performs a read access on a source resource, gets the data and puts it in the channel (n) FIFO; once the data is in the FIFO, the destination port is activated and performs a write access to the destination resource to write the data. Each channel controller includes a separate read address unit RAU(0–5) and a separate write address unit WAU(0–5).

All of the ports operate in parallel. In this embodiment, there are four ports connected the four data storage resources, therefore, four concurrent read/write accesses can be made on the same clock cycle. In order to support this access rate, the address computation and the interleaving are pipelined. Maximum transfer rate for this embodiment with four ports is two words (two reads and two writes) per CPU cycle. This is achieved when sources and destinations are independent. An alternate embodiment may have a larger number of ports with a correspondingly higher maximum transfer rate.

A read address bus RA includes seven individual buses for conveying a channel read address from each read address unit RAU(0–5) and from the HPI port to each port input mux 330–333 in parallel. A write address bus WA includes seven individual buses for conveying a channel write address from each write address unit WAU(0–5) and from the HPI port to each port input mux 330–333 in parallel. Likewise, a data output bus DO includes seven individual buses for conveying a data output value from each FIFO(0–5) and from the HPI port to each port input mux 330–333 in parallel. A data input bus DI includes four individual buses for conveying a data input value from each port to each FIFO(0–5) and to the HPI port in parallel.

A DMA port sends a request to its associated memory to read or write a data item in this memory. A transfer of one word consists of a read request on a source port i following by a write request on destination port j (i can be equal to j). A request is defined by its type (r for read, w for write) and the channel it belongs to.

example: $r_i$ is a read request in channel i
$w_j$ is a write request in channel j Each port has its own interleaver 350–353 to control the channel multiplexing on the associated port. The interleaver receives read and write requests from each channel, computes which is the next request that must be served, and triggers a port control state machine to serve this request.

DMA controller 210 has distributed request allocators 340a–340d respectively associated with port. There can be up to thirteen requests pending on any given clock cycle: six read requests, six write requests, and an HPI request. In order to reduce interleaver complexity, an interleaver in the present embodiment can interleave a maximum of five simultaneous requests at the same time. Request allocators 340a–340d scans the DMA configuration and pending requests signals on request bus 345 and selects a maximum of five request signals to send to each interleaver for processing. In an alternate embodiment, allocators 340a–340d may be grouped together into a single allocator circuit. In another embodiment, a more complex interleaver may directly receive and schedule all requests provided by all of the channels.

Each port has an associated port control block 360–363. These blocks are responsible for initiating the read/write accesses to the memories and peripherals. They implement the transaction access protocol between the memories or peripherals and the DMA. These protocols are the same for SARAM and DARAM. The. RHEA bus protocol and the EMIF protocol are different. Thus, each port is tailored to the type of resource to which it is connected.

Each channel controller has an associated priority block PRIO(0–5). The function of this block is to implement a three level priority scheme available in the DMA: high priority for HPI, high priority for channels, low priority for channels.

Each channel controller has an associated event synchronization block EVENT(0–5). Each event synchronization block waits for events that trigger a transfer in its channel. Each block also looks for event drops.

Channel FIFOs each have eight stages in this embodiment. FIFO receive the data communicated from a source port to a destination port. They allow the pipelining of DMA transfers and the bursting to/from external memories. Bursts of eight data words are possible in all channels.

Interrupt generator 370 generates interrupts to the CPU according to the DMA configuration and state. Each channel has its own associated interrupt signal, dma_nirq(5–0).

RHEA interface 380 interfaces RHEA bus 130a from the RHEA bridge. RHEA interface 380 is used only for CPU reads and writes in the DMA configuration registers. DMA accesses to RHEA peripherals are made through the RHEA port, not through the RHEA interface.

Descriptor blocks CFG(0–5) are used to control and monitor the status of the DMA transfers. There is one descriptor block per channel. They are read/written via RHEA interface 380.

HPI port 214 allows direct transfers between the HOST and the memory. This path supports HOM and SAM mode. In HOM mode, the DMA Registers are by-passed. Switching from SAM to HOM requires the DMA HOST channel to be empty before switching.

Figure 4:
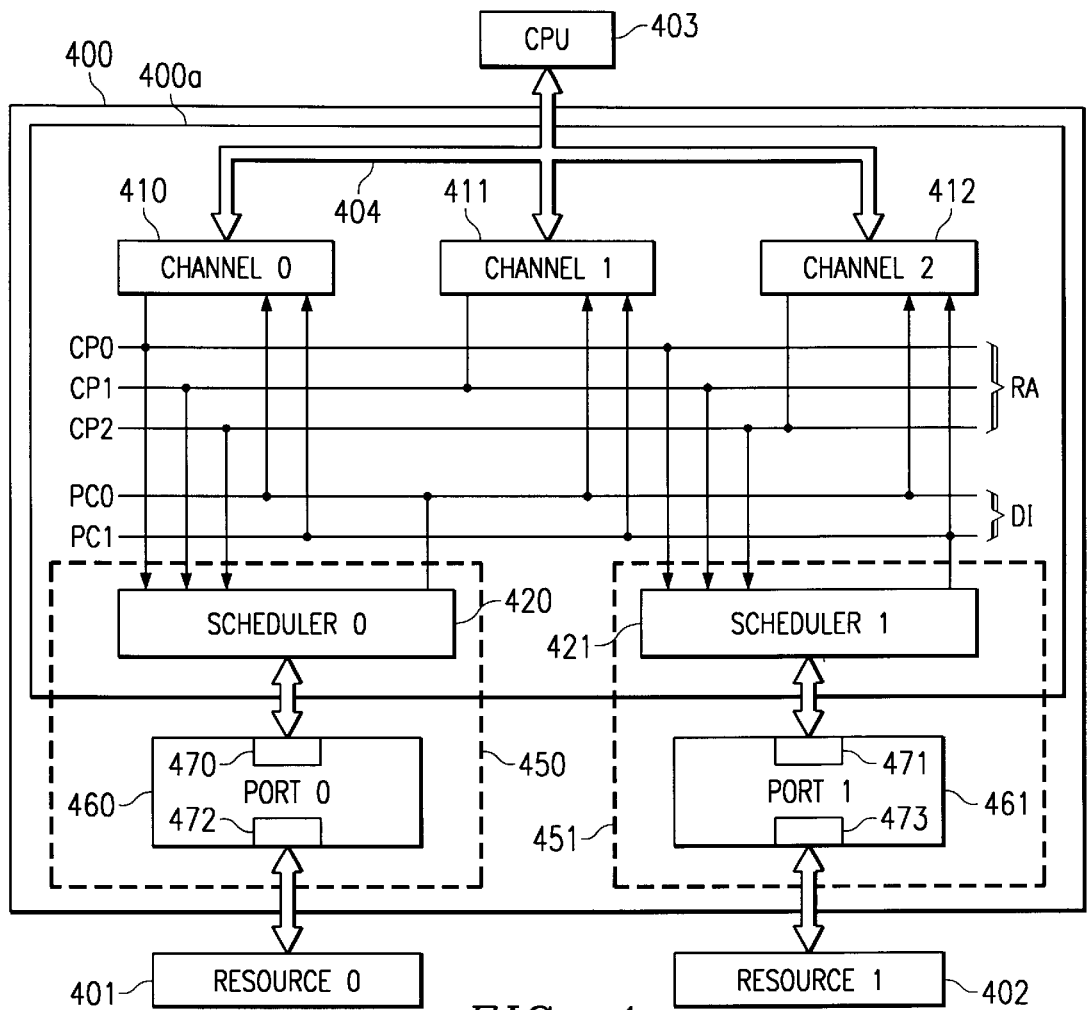
FIG. 4 is a block diagram of a portion of the DMA controller illustrating scheduler circuit and the parallel bus structure.

FIG. 4 is a block diagram of a portion of a DMA controller 400 illustrating the parallel bus structure. DMA controller 400 is representative of DMA controller 210, but is simplified in order to more clearly illustrate the parallel bus structure. Only three channel controllers 410–412 and two ports 450–451 are illustrated for clarity. Channel to port buses CP(0–2) are representative of the parallel buses that are included in the read address bus RA, write address bus WA and data output bus DO of FIG. 3. In this figure, only read address bus RA is shown, for clarity. Likewise, port to channel buses PC(0–1) are representative of the parallel buses that are included in data input bus DI. Scheduling circuitry 420 within port 450 includes request allocator circuitry, interleaver circuitry and mux circuitry and selects one of channel to port buses CP(0–2) to be connected to port controller 460 on each clock cycle for providing an address for a transaction performed on each clock cycle. Likewise, scheduling circuitry 421 within port 451 includes request allocator circuitry, interleaver circuitry and mux circuitry and selects one of channel to port buses CP(0–2) to be connected to port controller 461 on each clock cycle for providing an address for a transaction performed on each clock cycle. Advantageously, each scheduler 420–421 operates in parallel and source/destination address words are transferred in parallel to each scheduler via parallel buses represented by CP0–CP2. Advantageously, input/output data words are also transferred in parallel to/from each port controller 460–461.

CPU 403 provides configuration information to DMA controller 400 via bus 404. First port 460 is connected to resource 401 and second port 461 is connected to a second resource 402. Port controller 460 is tailored to provide an access protocol required by resource 401, while port controller 461 is tailored to provide an access protocol required by resource 402.

A channel interface 470 within port controller 460 receives the selected channel address and data signals from scheduling circuitry 420. Channel interface 471 within port controller 461 receives the selected channel address and data signals from'scheduling circuitry 421. Memory interface 472 within port controller 460 provides a connection to memory resource 401 for transferring address and data. Memory interface 472 within port controller 460 provides a connection to memory resource 401 for transferring address and data. According to an aspect of the present invention, channel interfaces. 470–471 on all of the ports in the DMA controller are identical, while memory interfaces 472–473 are tailored to match the transfer protocol of the associated memory resource.

In an alternative embodiment, port controllers 460–461 may be tailored to provide an access protocol required by a different type of resource. Advantageously, channel and scheduling circuitry within channel controller portion 400a of DMA controller 400 can interact with various versions of tailored port controllers without being modified.

Referring again to FIG. 2, DMA Controller 210 allows eight types of transfer mode for internal, external memory and peripherals by each channel, while the EHPI allows four types of transfers, as summarized in Table 2. Data transfer from peripheral to peripheral, such as from the receive side of a serial port to the transmit side of another serial port, is not directly supported by the DMA. Memory must be used as a temporary buffer to implement peripheral to peripheral DMA transfers.

TABLE 2

Transfer Mode Summary

| Internal Memory | → | Internal Memory |
| External Memory | → | External Memory |
| Internal Memory | → | External Memory |
| Internal Memory | ← | External Memory |
| Internal Memory | → | Peripherals |
| Internal Memory | ← | Peripherals |
| External Memory | → | Peripherals |
| External Memory | ← | Peripherals |
| Internal Memory | → | EHPI |
| EHPI | ← | Internal Memory |
| External Memory | → | EHPI |
| EHPI | ← | External Memory |

The channel descriptors summarized in Table 3 are used to configure a transfer in channel i.

TABLE 3

Channel Descriptors

| channel[i].src | Source of the transfer; channel[i].src = {0, 1, 2, 3}, set of port numbers. |
| channel[i].dst | Destination of the transfer; channel[i].dst = {0, 1, 2, 3}, set of port numbers. |
| channel[i].en | Enable/disable of the channel; channel[i].en = {0, 1}, where 0 means channel disabled and 1 means channel enabled. |

Figure 5:
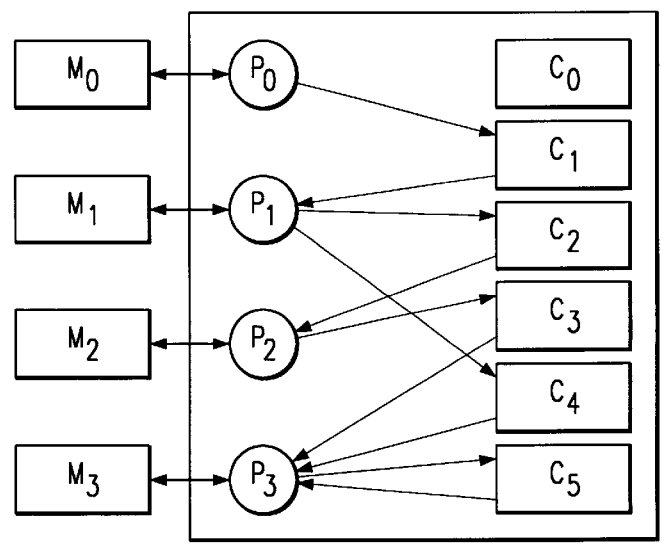
FIG. 5 is an activity diagram illustrating one example of a configuration for the DMA controller;.

Table 4 illustrates an example configuration of the six channels of the present embodiment, which is also illustrated in FIG. 5. In FIG. 5, each channel is indicated by boxes labeled C(0–5); each port is indicated by circles labeled P(0–3), and each resource is indicated by boxes labeled M(0–3).

TABLE 4

Example DMA Configuration

| Channel[0].src = | channel[3].src = 2 |
| Channel[0].dst = | channel[3].dst = 3 |
| Channel[0].en = | channel[3].en = 1 |
| Channel[1].src = 0 | channel[4].src = 1 |
| Channel[1].dst = 1 | channel[4].dst = 3 |
| channel[1].en = 1 | channel[4].en = 1 |
| channel[2].src = 1 | channel[5].src = 3 |
| channel[2].dst = 2 | channel[5].dst = 3 |
| channel[2].en = 1 | channel[5].en = 1 |

Advantageously, there are no limitations in the DMA configuration. A channel can loop on a port, in which case the same port is source and destination for a transfer, allowing copy of a data block from an address to another address in the same memory, eg: channel[i].src=channel[i].dst. Any number of channels can be time-multiplexed on the same port, eg: channel[0].src=channel[1].src=channel[2].src. All the channels can loop on the same port, eg: channel [i].src=channel[i].dst=channel [j].src=channel [j ].dst, for all i∈{0,1,2,3,4,5}), for all j∈{0,1,2,3,4,5}, i≠j.

Advantageously, this embodiment of the DMA controller allows two transfers to be fully parallel, if they involve different ports, eg: channel[i].src=0, channel[i].dst=1, for a i∈{0,1,2,3,4,5}; channel [j].src=2, channel[j].dst=3, for a j∈{0,1,2,3,4,5}; i≠j.

Scheduling

In order to provide the flexibility described above, each port has its own scheduling circuitry. When several channels want to have access to a DMA port they send requests to this port. The port must compute which request it is going to serve, which is referred to herein as scheduling.

The number of requests a port has to schedule depends on the DMA configuration, as programmed by the CPU for a given application. Round robin service is used to assure all of the requests waiting for service will be served. The scheduling is independent of the resource the port is connected to; therefore, the same scheduling algorithm is used for all ports. As used herein, "a request is, scheduled" means that the port scheduler has computed which request (among all the requests requiring this port) it is going to serve at the next clock cycle. "A request is acknowledged" means that a memory sends an acknowledge signal after it has received a request from the port it is connected to.

Figure 6:
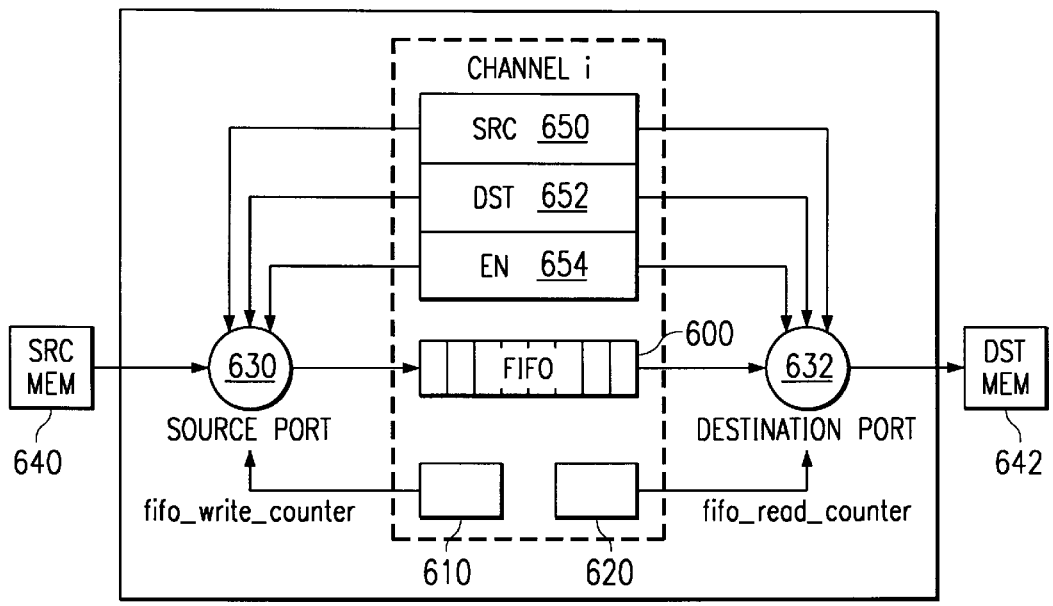
FIG. 6 is a block diagram illustrating the resources involved in scheduling each channel of the DMA controller.

FIG. 6 is a block diagram illustrating the resources involved in scheduling each channel of the DMA controller. Each channel has two counters to monitor the state of its FIFO. A channel[i] FIFO_write_counter 610 counts the number of writes that are going to be made in FIFO 600. It is incremented each time a read request $r_i$ is scheduled on channel i source port 630. The FIFO_write_counter is decremented each time a request $w_i$ is acknowledged on channel i destination port 632 (i.e. each time a data of channel i is written into destination memory 642). The reset value of this counter is zero. Channel i generates a write request to a port p if there is at least one data in the channel i FIFO A channel[i] FIFO_read_counter 620 counts the number of data that can be read in FIFO 600. It is incremented each time a read request $r_i$ is acknowledged on channel i source port 630 (i.e each time a data is read from source memory 640). Channel[i] FIFO_read_counter 620 is decremented each time a write request $w_i$ is scheduled on channel i destination port 630. The reset value of this counter is zero. Channel i generates a read request to a port p if there is at least one place to store the data read in the channel i FIFO 600.

A write request on the destination port can appear only if channel[i]. FIFO_read_counter >0, i.e only after a read request has been served in the source port.

The scheduler scans all the channels descriptor registers (source descriptor 650, destination descriptor 652, and enable descriptor 654) and FIFO counters (FIFO write_counter 610 and FIFO_read_counter 620) to see if requests are waiting to be served. Each possible request is given a request identifier, i.e.: channel(i) read request identifier=i*2, where i ϵ{0,1,2,3,4,5}; channel(i) write request identifier= i*2+1.

The total number of possible active channel requests in the DMA is twice the number of channels, since a write and a read requests are possible in each channel. Additionally, a request from the HPI port is treated as a DMA channel request. If there is a request waiting, it is served. If there are several requests waiting, they are served on a round robin scheme.

Figure 7:
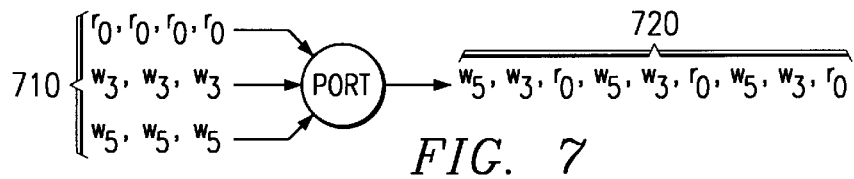
FIG. 7 is a timing schematic illustrating round robin scheduling in the DMA controller.

FIG. 7 is a timing schematic illustrating round robin scheduling in the DMA controller. A set of requests indicated at 710 will be served in the order indicated at 720.

The operation of the allocator and interleaver will now be described in more detail. The request allocator takes the information of each channel's source and destination to fill in, per port, a resource allocation table. This table indicates for each request if it is active (Tag=1 if active), the corresponding channel number (channel=channel number) and priority (Prio=channel priority), and if the port is the channel source or destination (OP=1 when source, else 0).

The table is filled in first with the high priority requests, and if there is room left, with the others requests. If a new high priority request arrives and the table is full, a low priority request, if present in the table, is removed and replaced by the high priority request. This will happen even if the other end of the channel, i.e., source/destination, cannot fit in the corresponding request in the corresponding resource allocation table.

Figure 8:
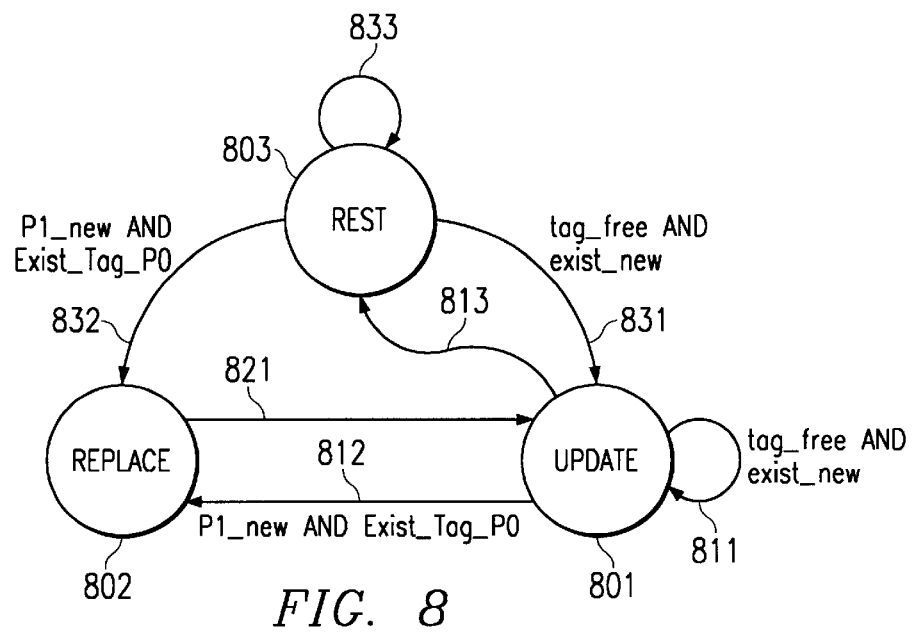
FIG. 8 is a state diagram of a state machine for the allocator circuit of each port of the DMA controller.

Referring again to FIG. 3, there are four independent allocator state-machines 340a–340d, one per port. FIG. 8 is a state diagram of a state machine for the allocator circuit of each port of the DMA controller. For each port, the corresponding state-machine scans the channel descriptor registers to see if there is room left in the resource allocation table and if there is an enabled channel requiring communicating through the port. If there is an active request for the considering port that has not yet been served (Exist_new=1) and room left in the resource allocation table (Tag_free=1), then the table is updated in update state 801 as indicated by link 831 and 811. If there is no more room left in the table, but the new request is a high priority one (P1_new=1) and there is a low priority request in the table (Exist_tag_P0) as indicated by link 812 and 832, then this one is replaced in replace state 802. If there is no new request, then the state machine returns to rest state 803 via link 821 and 813.

FIG. 9A–FIG. 9G is a flow chart of the allocator finite state machine of FIG. 8. In these figures, designations for scanned registers in each channel are defined in Table 5. Designations for entries in the allocation table of each port are defined in Table 6. Signal names are defined in Table 7.

TABLE 5

Designations for Scanned Channel Registers

| | |
|---|---|
| E(5:0) | Channel Enable |
| SRC(5:0) | Channel Source |
| DEST(5:0) | Channel Destination |
| New_SRC(5:0) | Channel New Source The bits New (New_SRC and New_DEST) are set to one when a rising transition is detected on the corresponding enable bit E(i) |
| New_DEST(5:0) | Channel New Destination |
| P(5:0) | Channel priority |

TABLE 6

Designations for Allocation Table Entries

| | |
|---|---|
| Tag(3:0) | Tag |
| Channel(3:0) | Tag Channel |
| Op(3:0) | Tag Operation |
| Prio(3:0) | Tag Priority |

TABLE 7

Signal Names

| | |
|---|---|
| RNW | toggle bit indicating the operation type in loop channel |
| New(i) | New_SRC(i) + New_DEST(i) |
| Exist_new | for(i = 0–5): OR(New(i).E(i).((SRC(i) = Port) + (DEST(i) = Port))) |
| P1_new | for(i = 0–5): OR(P(i).New(i).E(i).((SRC(i) = Port) + (DEST(i) = Port))) |

TABLE 7-continued

Signal Names

| | |
|---|---|
| Exist_tag_P0 | for(i = 0–3): OR(Tag(i).PRIO(i)) |
| Tag_free | for(i = 0–3): OR(Tag(i)) |

Figure 9A:
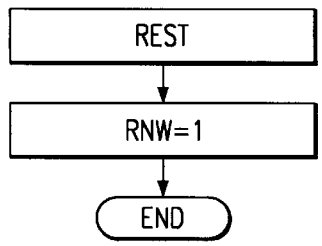
FIG. 9A is a flow chart of the rest state of FIG. 8.

FIG. 9A is a flow chart of rest state 801 of FIG. 8.

Figure 9B:
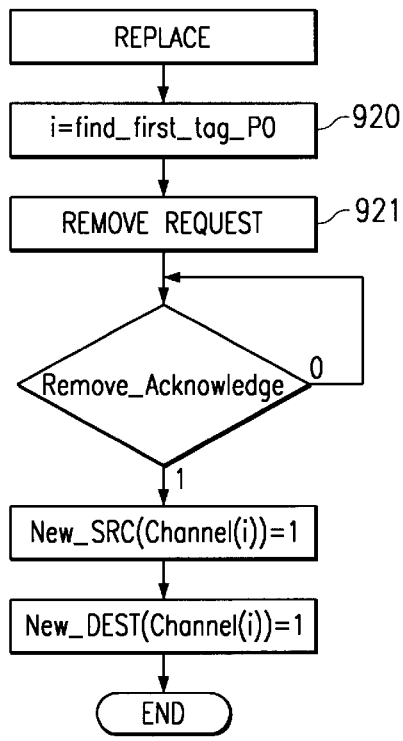
FIG. 9B is a flow chart of the replace state of FIG. 8.

FIG. 9B is a flow chart of replace state 802 of FIG. 8. A low priority request "i" is determined in step 920, which is explained in more detail in FIG. 9G. The low priority request is removed from the allocation table in step 921.

Figure 9D:
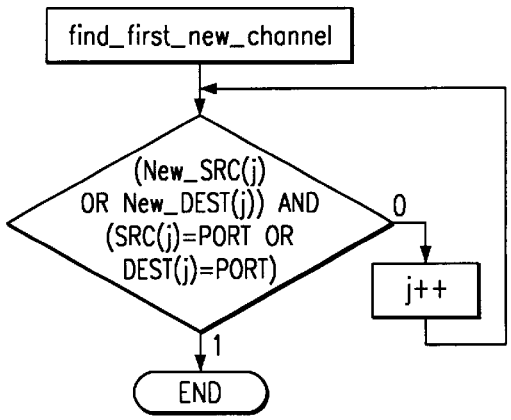
FIG. 9D is a more detailed flow chart of the find_first_new_channel step.
Figure 9C:
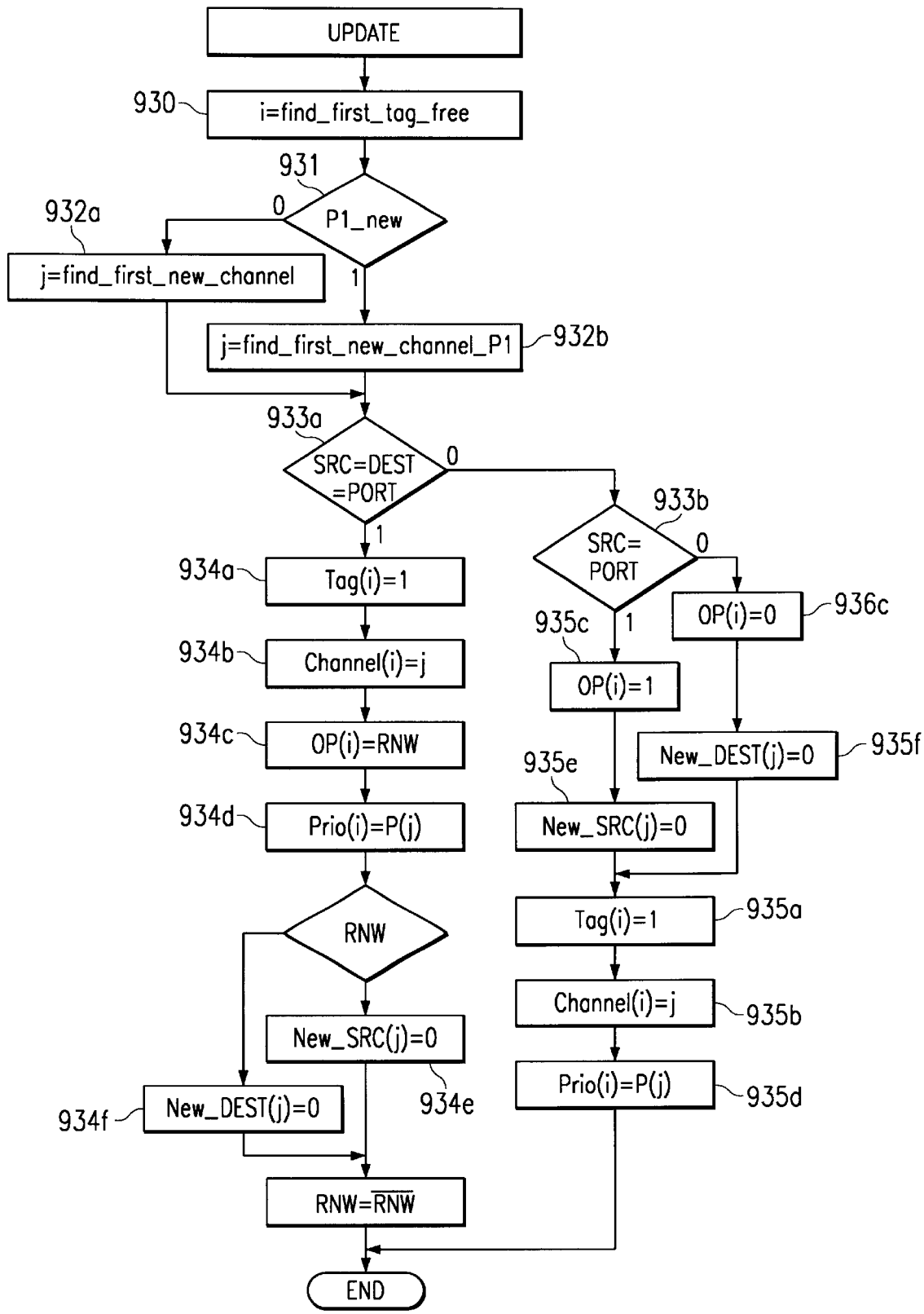
FIG. 9C is a flow chart of the update state of FIG. 8.

FIG. 9C is a flow chart of update state 801 of FIG. 8. A free tag "i" is determined in step 930, which is explained in more detail in FIG. 9F. If step 931 indicates the new request is a low priority request, a new channel is selected in step 932a, which is explained in more detail in FIG. 9D. If step 931 indicates the new request is a high priority request, a new channel is selected in step 932b, which is explained in more detail in FIG. 9E. If step 933a determines that the port is both the source and the destination, then the tag bit is set to "1" in step 934a, the channel bits in the tag are set to reflect the selected channel in step 934b, the operation bit is set to RNW in step 934c, and the priority bit in the tag is set to the priority of the selected channel in step 934d.

Still referring to FIG. 9C, if step 933a and 933b determine the port is only the source, then operation bit is set to "1" in step 935c. If the port is only the destination, then the operation bit is set to "0" in step 936c. In either case, the tag bit is set to "1" in step 935a, the channel bits in the tag are set to reflect the selected channel in step 935b, and the priority bit in the tag is set to the priority of the selected channel in step 935d.

The new_source bit of the selected channel is turned off in either step 934e or 935e and the new_destination bit of the selected channel is turned off in either step 934f or 935f.

FIG. 9D is a more detailed flow chart of the find_first_new_channel step.

Figure 9E:
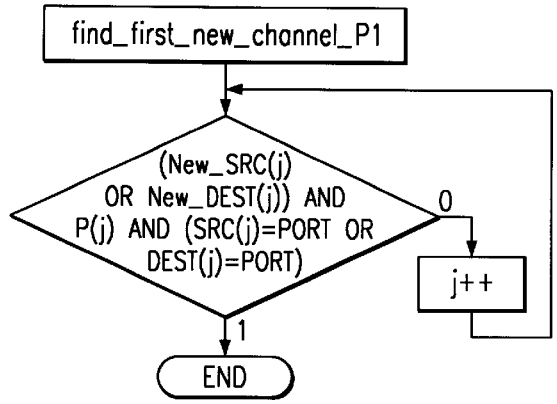
FIG. 9E is a more detailed flow chart of the find_first_new_channel_P1 step.

FIG. 9E is a more detailed flow chart of the find_first_new_channel_P1 step.

Figure 9F:
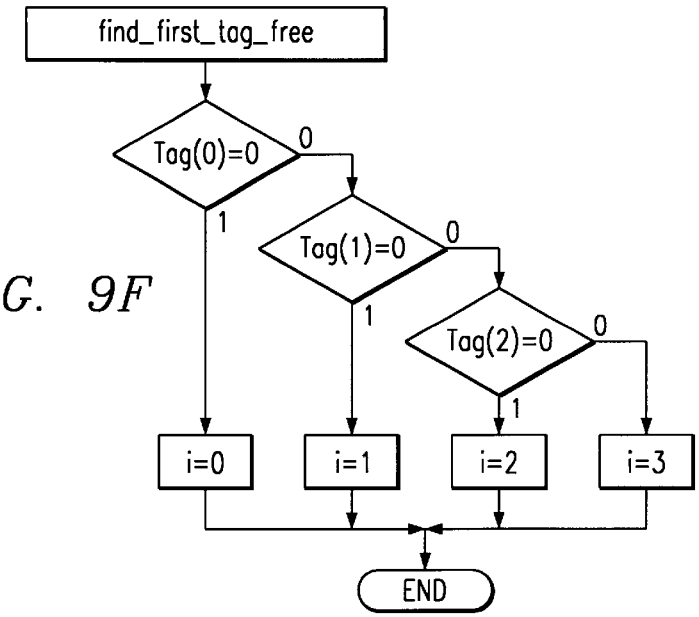
FIG. 9F is a more detailed flow chart of the find_first_tag_free step.

FIG. 9F is a more detailed flow chart of the find_first_tag_free step.

Figure 9G:
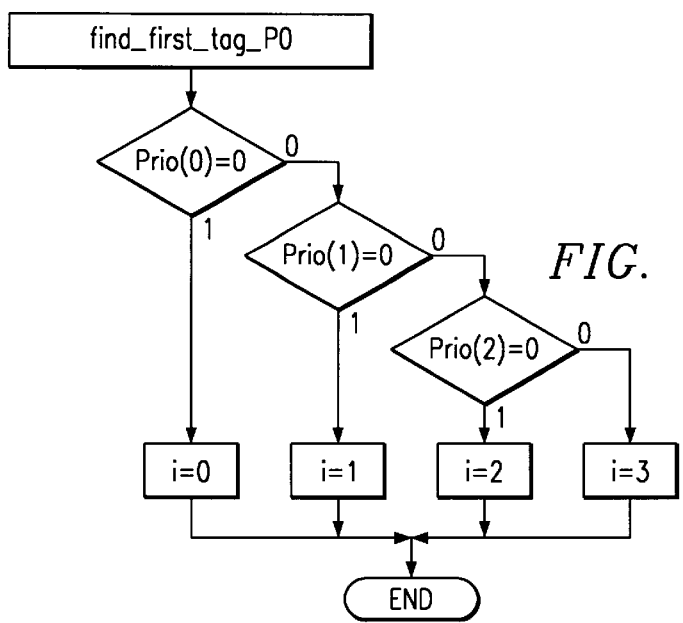
FIG. 9G is a more detailed flow chart of the find_first_tag_P0 step.

FIG. 9G is a more detailed flow chart of the find_first_tag_P0 step.

Figure 10:
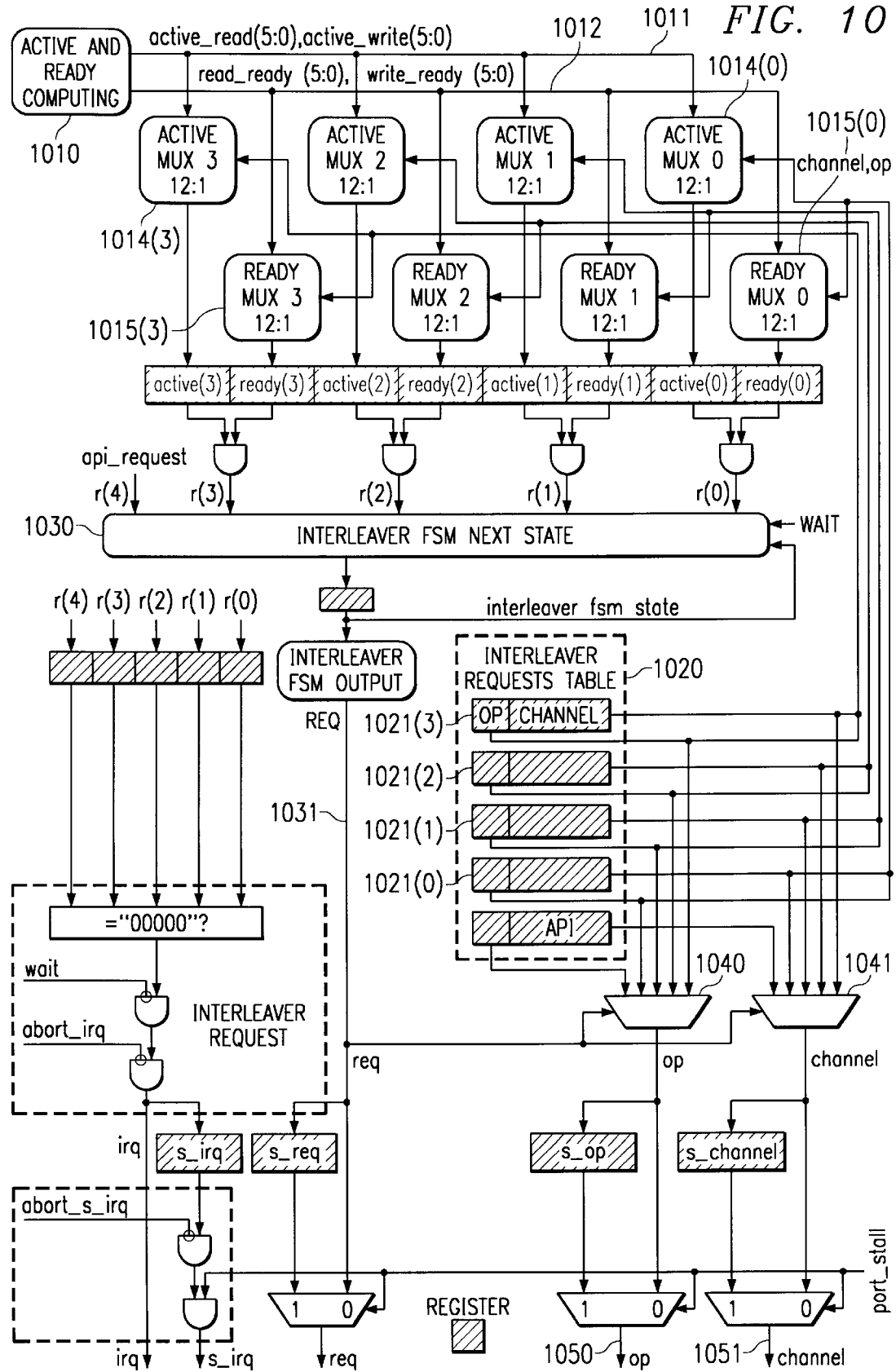
FIG. 10 is a block diagram of an interleaver circuit for the DMA controller.
Figures 11, 12, 13, 14:
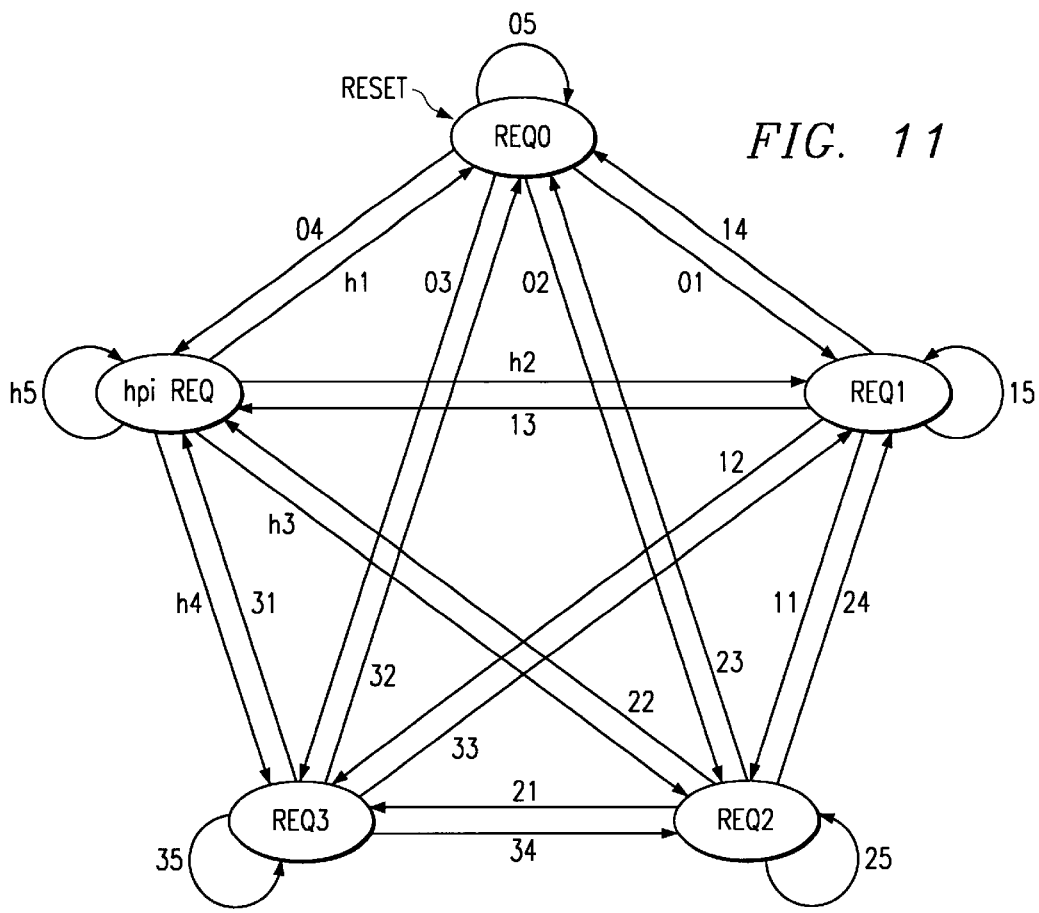
FIG. 11 is an illustration of the interleaver finite state machine of FIG. 10.
FIG. 12 illustrates a DMA Enable/Disable control register.
FIG. 13 illustrates a DMA Channel Control register.
FIG. 14 illustrates a DMA element count register.

FIG. 10 is a block diagram of an interleaver circuit for the DMA controller, while FIG. 11 is an illustration of the interleaver finite state machine of FIG. 10. The purpose of the interleaver is to compute the next request that must be served by a port. There is one interleaver block per port. There are two classes of requests: read request and write requests.

In the whole DMA controller of the present embodiment, six write requests (one per channel) and six read requests (one per channel) plus one HPI request (read or write) can be active at the same time. These requests are distributed on the four ports of the DMA controller by the request allocators, as described above.

In the present embodiment, only four channel requests plus an HPI request can be active at the same time on the same port. This is so the interleaver finite state machine can evaluate within a required time period, as will be discussed later. The choice of the subset of four channel requests that are active on a port is made by the request allocator associated with that port, according to the DMA configuration and the priority of the channels.

The requests are served following a multi-class fair queueing system. There can be three queues of waiting requests: high priority HPI requests, high priority HPI or channel request and low priority HPI or channel requests. Multi-classing is implemented in a priority block (not illustrated) that is connected to priority registers PRIO(0–5) in channel controllers 310–315 for high and low channel/HPI requests, and in the interleaver state machine for HPI high priority requests. Inside a waiting queue, every request has same priority to access the port, as the request are served in a fair round robin manner. Fair (Round Robin) service is implemented in the interleaver. Pending requests are held in queues. The queues for read requests are the read address units, and the queues for write requests are the FIFO's.

For a given DMA transfer, the number of requests that will be processed is equal to the number of words to move multiplied by two (for a word, there is a read request, and then a write request).

A port will interleave only the requests that are active and ready on the port. A request is active on a port if: (a) this port is source or destination for this request, (b) the channel is enabled, (c) the triggering event has been received (only if the channel is a synchronized one), and (d) there is no channel with higher priority requesting this port (in read or write).

An active read request in a channel is ready to be served if by the port where it is active if: (a) the FIFO of this channel isn't full, and (b) no end_dma has been -received for its channel.

An active write request in a channel is ready to be served by a given port if: (a) the FIFO of this channel isn't empty, and (b) no end_dma has been received for its channel.

When a request is selected for service by the interleaver, the interleaver activates the port protocol state machine, and the request is processed. When a request is in service, and the accessed memory resource doesn't respond, wait states are inserted by the port protocol state machine. The port then sends a signal to stall the interleaver.

A request takes several cycles to be served, but the requests are pipelined. Thus, the DMA controller can transfer one data per cycle, if a port response isn't delayed by a CPU access or a wait state.

If a request has been allocated, but it is not ready to be served, the interleaver will simply ignore that request and serve the other ready requests. Once the request becomes ready, it will be served in round robin fashion.

Referring again to FIG. 10, each interleaver receives two status signals, active and ready, per request from active and ready circuitry 1010 that is distributed within each channel controller 310–315. Signals 1011 are the active status signals and include separate read and write active status signals from each of the six DMA channel controllers. Signals 1012 are the ready status signals and include separate read and write ready status signals from each of the six DMA channel controllers. These signals are used by the interleaver to determine whether a request is ready to be served or not. Request allocation table 1020 is maintained by the allocation circuitry, as. discussed earlier. Request allocation table 1020 has four entries 1021(0–3) for the four channel request tags that may be allocated for a given port. Each request tag has a channel field, an operation field and a parity field, as described earlier. A set of multiplexors 1014(0–3) and 1015(0–3) each receive all twelve status signals. A control input on each multiplexor is connected to the respective request tag so that the active and ready status signals for each allocated request are selected and provided in combined form on status output r(0–3). Interleaver finite state machine 1030 is connected to the selector outputs r(0–3) and has a next request output 1031 which specifies the next request that will be serviced by the port.

Referring now to FIG. 11, the interleaver finite state machine will be described. The function of this state machine is to control the interleaving of requests that have been allocated by the allocation circuit. A request is active until the end of the element is reached, if the element is a block of words.

The interleaver state machine determines which request among the ready ones should be launched. This choice is performed following a round robin scheme. If r is the current request served, the next request to serve will be:

TABLE 8

Round Robin Scheduling (r+1) mod 5 if channel r+1 is ready
else (r+2) mod 5 if channel r+2 is ready
else (r+3) mod 5 if channel r+3 is ready
else (r+4) mod 5 if channel r+4 is ready
else (r+5) mod 5 if channel r+5 is ready
else no request        /* no channel ready */

Transition from one state to another is determined by the following inputs: r(4:0) and wait. For r(4:0), if r(r)=1, the request number r is ready to be served. r(4) is the HPI request, active only when HPI requires a transfer with the same level of priority as the channels. If the wait signal equals one, the interleaver is stalled and its state remains the same. The wait signal=/end_element +idle +suspend +port_stall.

Next request output 1031 of the state machine is the number of the line of the interleaver requests table which contains the request to be served next. From this number, the type of operation (read or write) requested on the port, and the channel is derived by muxes 1040–1041 connected to allocation request table 1020.

In FIG. 11, the transitions are identified with a two digit number. The first digit is the origin state of the transition (0 for req0, 1 for req1, . . . , h for hpi_req). The second digit is a transition index. Transitions are detailed in Table 9—Interleaver State Machine Transitions, where "/" is not, "+" is logical or, and "." is logical and.

TABLE 9

Interleaver State Machine Transitions

| tran-sition tag | condition |
|---|---|
| 01 | r(1)./w |
| 02 | /r(1).r(2)./w |
| 03 | /r(1)./r(2).r(3)./w |
| 04 | /r(1)./r(2)./r(3).r(h)./w |
| 05 | w + /r(1)./r(2)./r(3)./r(h).r(0)./w + /r(1)./r(2)./r(3)./r(h)./r(0)./w |
| 11 | r(2)./w |
| 12 | /r(2).r(3)./w |
| 13 | /r(2)./r(3).r(h)./w |
| 14 | /r(2)./r(3)./r(h).r(0)./w |
| 15 | w + /r(2)./r(3)./r(h)./r(0).r(1)./w + /r(2)./r(3)./r(h)./r(0)./r( 1)./w |
| 21 | r(3)./w |
| 22 | /r(3).r(h)./w |
| 23 | /r(3)./r(h).r(0)./w |
| 24 | /r(3)./r(h)./r(0).r(1)./w |
| 25 | w + /r(3)./r(h)./r(0)./r(1).r(2)./w + /r(3)./r(h)./r(0)./r(1)./r(2)./w |
| 31 | r(h)./w |

TABLE 9-continued

Interleaver State Machine Transitions

| tran-sition tag | condition |
|---|---|
| 32 | /r(h).r(0)./w |
| 33 | /r(h)./r(0).r(1)./w |
| 34 | /r(h)./r(0)./r(1).r(2)./w |
| 35 | w + /r(h)./r(0)./r(1)./r(2).r(3)./w + /r(h)./r(0)./r(1)./r(2)./r(3)./w |
| h1 | r(0)./w |
| h2 | /r(0).r(1)./w |
| h3 | /r(0)./r(1).r(2)./w |
| h4 | /r(0)./r(1)./r(2).r(3)./w |
| h5 | w + /r(0)./r(1)./r(2)./r(3).r(h)./w + /r(0)./r(1)./r(2)./r(3)./r(h)./w |

The port state machine in the port controller circuit is activated by an aver request signal irq. This signal is active if there is at least a ready (i.e r(5:0)≠"00000"), if wait isn't active and if the abort_irq signal isn't active. Abort_irq is used to discard the current requests in case of end_dma, timeout or event_drop.

On reset, the state machine is initialized in the req0 state. If no request is ready, or if there is a wait, the interleaver state remains the same.

A wait can occur if (a) there is a port stall (ready not returned from the resource accessed), (b) the dma is idled or suspended, (c) the end of the element currently transferred is not reached, or (d) there is a HPI high priority access. If an element is several words in length, wait is used to make the interleaver wait for the end of the element. The end of element is signaled by the address unit (stage A0), and propagated in the pipeline.

From the interleaver FSM output, the type of the request (operation) 1050 and its channel 1051 is known. The operation is coded on 1 bit (0=write, 1=read ). The channel is coded on three bits.

The scheduling algorithm is described in more detail in Table 11 using psuedo code with terms defined in Table 10.

TABLE 10

Terms Used in Scheduling Algorithm

| inputs: | |
|---|---|
| current_request | the request identifier of the request served at current clock cycle c |
| the descriptors of each channel | src, dst and en |
| FIFO monitoring counters of each channel | FIFO_read_counter and FIFO_write counter |
| port_id | identifier of the port |
| FIFO_SIZE | size of the FIFOs |
| REQUEST_NUMBER | number of possible requests multiplexed on the port |
| outputs: | |
| next_request | the request identifier of the request that must be served at clock cycle c + 1. From this identifier the channel and the type of request to serve is known. |
| found | boolean flag, true when the next request to serve has been found. If after the scheduling computation, found is equal to zero, then no request is schedule and the current request remains the same. |
| variables: | |
| rid | request identifier index |
| found | boolean flag |
| i | channel number computed from rid |

TABLE 11

Scheduling Algorithm

```
rid = (current_request+1)%REQUEST_NUMBER;
found = 0;
while (( rid != current_request )&& !found ){
i = rid/2;
if( channel[i].en ){        /*channel is enabled */
if( channel[i].src == port_id ){    /* this port is source */
   if( channel[i]. FIFO_write_counter < FIFO_SIZE ){
         /* there is place in the FIFO */
      found = 1;
      channel[i]. FIFO_write_counter++;
   }
   else{
      found = 0;       /* there is no place in the FIFO */
      rid = (rid+1)%REQUEST_NUMBER;   /* this request can't
      be served */
         /* switch to the next request */
   }
}
if(channel[i].dst == port_id ){    /* this port is dest */
   if( channel[i]. FIFO_write_counter > 0 ){
         /* there is data in the FIFO */
      found = 1;
      channel[i]. FIFO_read_counter--;
   }
   else{
      found = 0;       /* there is no data in the FIFO */
      rid = (rid+1)%REQUEST_NUMBER;   /* this request can't
      be served */
         /* switch to the next request */
   }
}
else{    /* this port isn't used by the channel */
found = 0;
rid = (rid+1)%REQUEST_NUMBER;     /* switch to the next
request */
}
}
else{    /* channel is disabled */
found = 0;
rid = (rid+1)%REQUEST_NUMBER;     /* switch to the
next request */
}
}
next_request = rid;
```

This scheduling computing is performed in one clock cycle in each of the DMA ports. This algorithm is generic and is the same for all the DMA ports. The only signal required from each of the resources is an acknowledge signal. If the resource does not have an acknowledge signal, then a known predictable response time is used. There is no direct communications between the source and the destination ports: both see only the FIFO monitoring counters. Thus the destination transfer rate conforms itself to the source reading rate. The scheduling algorithm works with any number of channels; the only limitation is the amount of time (clock period) available to compute next_request, and the area budget available for additional transistors, since a new channel adds a new FIFO and a new set of descriptors. According to an aspect of the present invention, a larger number of requests can be accommodated by selecting a subset of pending requests with the allocator. The size of the subset is selected so that the interleaver state machine can compute the next request within the time period of a single clock period. For the present embodiment, the size of the subset is five: four channel requests plus the HPI request. Other embodiments with faster or slower clocks, for example, may have a different size pending request subset.

During operation, a given port can easily be specialized to handle only one channel or a subset of channels by disabling unwanted channels on the given port by using the enable descriptor register. In another embodiment, a given port can easily be specialized to handle only one channel or a subset of channels by permanently disabling unwanted channels on the given port.

Various control registers will now be described in more detail. The DMA control registers are memory mapped in a 64 KW peripheral space of megacell 100. Another embodiment of the present invention may place the control registers in other memory address spaces, or the registers may be accessed directly, for example. FIG. 12 illustrates a single global. DMA Channel Enable/Disable control register. Table 12 lists a set of control registers that are associated with DMA channel.

TABLE 12

Control Registers Associated With Each Channel

| LocalReg_addr | name | Description |
| --- | --- | --- |
| 0x0000 | DMCCRn | DMA Channel n Control Register |
| 0x0001 | DMCCR2n | DMA Channel n Control Register 2 |
| 0x0002 | DMMDPn | DMA channel n Main Data Page for source & destination memory address |
| 0x0003 | DMSRCn | DMA channel n Source address register |
| 0x0004 | DMDSTn | DMA channel n Destination address register |
| 0x0005 | DMECn | DMA channel n Element Count register |
| 0x0006 | DMFCn | DMA channel n Frame Count register |
| 0x0007 | DMEIDXn | DMA channel n Element Index |
| 0x0008 | DMFIDXn | DMA channel n Frame Index |
| 0x0009 | DMSTATn | DMA channel n Status register |

Referring to FIG. 12, the DMA Enable/Disable Control Register (DMEDC) is a 16-bit read/write register. It contains the DMA transfer priority and transfer enable control for each DMA channel. A DMA Enable/Disable Control Bit (DE[5:0]) field specifies the DMA enable/disable control for each channel (0=disabled, 1=enabled). The DE[5:0 ] fields are set to zero upon reset.

A Channel priority PRIO[5:0] field defines the priority of each channel: PRIO[i ]=0 indicates channel i has a low priority; PRIO[i]=1 indicates channel i has a high priority. A HPI priority HPI[1:0] field defines the priority of the host port in relation to the DMA channels. When EHPI[1:0]=10 or 11, the HPI has the HIGHEST priority versus all DMA Channels, and can access on-chip RAM only. Other DMA channels cannot access on-chip RAM. When HPI[1:0]=01, the HPI is integrated in the DMA channel TDM flow and is treated as a HIGH priority channel. When HPI[1:01]=00, the HPI is integrated in the DMA channel TDM flow and is treated as a LOW priority channel. HPI[1:0]=11 upon reset.

Transfers of all channels are Time Division Multiplexed in a round-robin fashion. In a given round-robin queue, each channel is switched to the next channel after its read has been triggered. The low priority channels will be pending as long as high priority channels need to be triggered. Low priority channels are triggered in a round-robin fashion when event synchronized high priority channels are waiting for events and non synchronized priority channels are completed.

Still referring to FIG. 12, a CPU/DMA busses priority bit specifies the priority of CPU 200 with respect to DMA controller 210 when both access the same memory resource. When CPU/DMA=1, CPU 200 busses have priority over DMA 210 busses for all internal and external memory accesses. whem CPU/DMA=0 busses have priority over CPU 200 busses for external memory accesses.

A FREE bit controls a free run mode. If FREE=1, free run is selected in the situation when a breakpoint is encountered in a debugger, for example.

FIG. 13 illustrates a Channel Control register, as listed in Table 12. The DMA Channel Control Register DMCCRn is a 16-bit read/write register which controls the DMA operation of its associated channel. A DMA Word/Burst Transfer Mode (WDBRT[1:0]) field defines the element size of the transfer, as indicate in Table 13.

TABLE 13

Transfer Mode

| WDBRT value | Transfer Mode |
| --- | --- |
| 00 | 16 bits Word Mode |
| 01 | 32 bits Word Mode |
| 10 | 4*16 bits Burst Mode |
| 11 | 8*16 bits Burst Mode |

When the 32 bits word or burst transfer mode is enabled, two consecutive DMA transfers will be performed and the DMA state machine will also takecare of it. Regardless of the index mode, the DMA address unit generates the address for most significant word (MSW) with the effective address value and the address for the least significant word (LSW) by inverting the LSB of the effective address.

Transfer Index mode for Source (SIND[1:0]) field and transfer mode for destination (DIND[1:0]) fields bits specify the index mode of addressing, as indicating in Table 14. The SIND & DIND bits are set to zero upon reset.

TABLE 14

Transfer Index Mode

| SIND/DIND Value | Index Mode |
| --- | --- |
| 00 | No modify |
| 01 | Post Increment |
| 10 | Post Increment with element index offset (DMEIDXn) |
| 11 | Post Increment with element and frame index offsets (DMEIDXn and DMFIDXn) |

A DMA Transfer Source Space Select (SRC[1:0]) field specifies the space selected for the transfer source address. A Transfer Destination Space Selected (DST[1:0])field specifies the, space select for the transfer destination address, as indicate in table 15. Another embodiment may have different resources for source/destination.

TABLE 15

Transfer Space Selection

| SRC/DST value | Source Space |
| --- | --- |
| 00 | SARAM |
| 01 | DARAM |
| 10 | EMIF |
| 11 | RHEA |

A Frame Synchronization Bit controls frame synchronization. When FS=0, frame Synchronization is disabled and element synchronization mode is enabled. Each element transfer waits for the selected event to occur before proceeding. When FS=1, frame synchronization is enabled. Each frame transfer waits for the selected event to occur before proceeding. Only one event is needed to synchronize an entire frame transfer (all the frame elements.

Element Synchronization Mode requires one event per element transfer (one element can be 16 bits word, or 32 bits word, a burst of 4*16 bits or 8*16 bits depending on the chosen element size). For example in 32-bit mode transfer, the DMA Controller requires only one event input for the consecutive two 16-bit word transfer.

Frame Synchronization Mode requires one event to trigger the entire frame transfer, which corresponds to the transfer of all the frame elements. If a channel is not event synchronized, a transfer on the channel is started when it is its turn in the round-robin scheme.

Synchronization Control Bit field (DSYN[4:0]) bits specify the event which can initiate the DMA transfer for the corresponding DMA channel. The 5-bit field of DSYN[4:0] allows many synchronization options. Megacell 100 has six external interrupts, two timer interrupts, and four input events for each of the three peripherals. Other embodiments of the present invention may have different event synchronization options. The DSYN[4:0] field is set to zero upon reset. When zero, no event synchronization is provided.

FIG. 14 illustrates a DMA element count register, DMECn. The DMA Element Count Register is a 16-bit read/write register that contains the number of elements per frame in the channel transfer block. This 16-bit register allows specification of the 16-bit unsigned count value. The number of elements to transfer can be set between 1 and 65535. This register is not initialized upon reset. This register can be written during a DMA transfer. When end of block is reached, if autoinit is set, DMECn is moved to its shadow register.

DMA Pipeline

The DMA contains two concurrent pipelines: an address pipeline and an interleaver pipeline. In these pipelines, some stages are private to a channel, and some are shared between the channels. The interleaver pipeline is composed of two sets of stages: the read stages (R prefix) and the write stages (W prefix). A one word transfer will go through all of stages: the read stages for the read request, and the write stages for the write request.

Figure 15A:
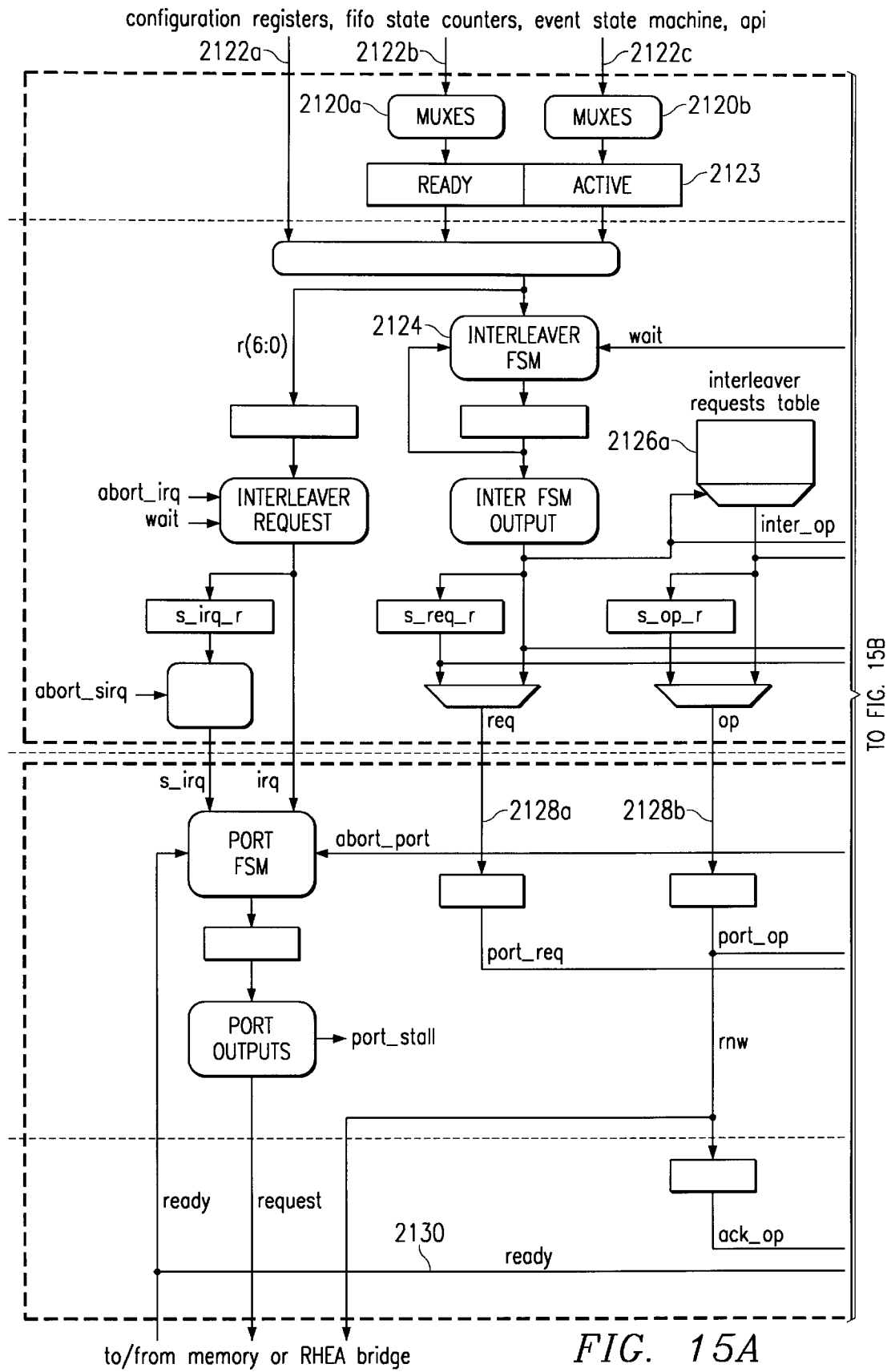
FIG. 15 is a block diagram of an interleaver/port pipeline of the DMA controller.
Figure 15B:
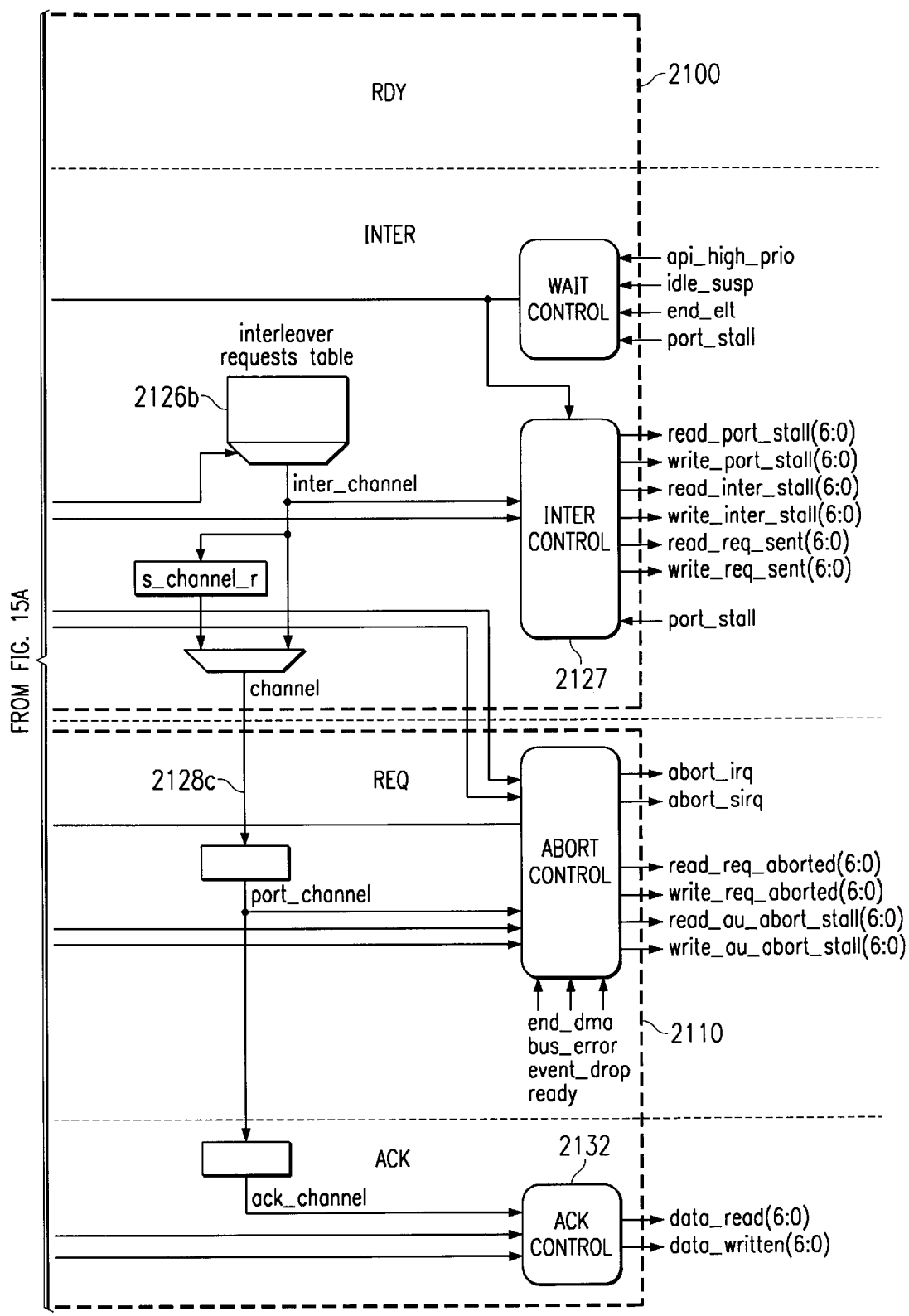

FIG. 15 is a block diagram of an interleaver/port pipeline of the DMA controller of digital system 10. Block 2100 contains the two interleaver stages, RDY and INTER. Block 2110 contains the two port stages REQ and ACK. Muxes 2120a and 2120b receive signals 2122a–c from the configuration registers, FIFO state counters, an event state machine and the HPI and provide them to ready and active circuitry 2123 to form ready and active signals, respectively, from all of the address units. The ready and active signals are provided to interleaver finite state machine 2124 which selects the request that will be processed next by the associated port. Interleaver request tables 2126a and 2126b store pending operation type and channel, respectively. A selected request, along with type of operation (read, write) and selected channel are provided on signal lines 2128a–c, respectively to the REQ stage of port control circuitry 2110. At the same time, a request signal is sent by interleaver control circuitry 2117 to mux 2010 or 2012 to select the appropriate channel address in response to the transfer scheduled by the interleaver. The selected address is then sent from the A_out stage to the memory resource associated with the port. A ready signal 2130 is asserted by the associated memory or RHEA bridge to indicate that a requested data word has been read and is available or has been written.

FIG. 16 is a timing diagram illustrating a transfer of six words from the SARAM port to the RHEA port which is representative of a typical transfer between any pair of ports in digital system 10, such as illustrated in FIG. 5. In this figure, for the channel FIFO write counter command w_com, "+" means increment and "−" means decrement. Signal nw_cnt indicates the channel FIFO write counter next state. Likewise, for the channel FIFO read counter command r_com, "+" means increment and "−" means decrement. The signal nr_cnt indicates the channel FIFO read counter next state.

TABLE 16

Notation for FIG. 16

| | |
|---|---|
| ai | data number i of channel a. |
| b | a request of channel b |
| is | interleaver stall |
| ps | port stall |
| ips | interleaver and port stalls |
| e | end block (end transfer) |
| A | abort |

Referring still to FIG. 16, a transfer of six words from SARAM to RHEA in one channel, called a, is illustrated.

The pipeline starts at time t0 with the load of the initial addresses in the r_a1 and w_a1 registers and the initial word, element and frame counters value (stage r_a0, w_a0). From these values, end_element, end_block and end_frame signals are computed. As end_block isn't reached, read_ready (r_rdy stage) transitions to 1, allowing the first request a0 to be interleaved (r_inter stage) at time t2 and issued (r_req stage) at time t3.

In the same time, the write addresses propagate in the write address pipeline. As there are still no data in the FIFO, write_ready stays at 0 (w_rdy stage), and no requests of channel a are interleaved at stage w_inter. This produces an interleaver stall to the write addresses pipeline to stop the write addresses propagation.

Data are read from the memory and written in the FIFO at time t5. Once the next state of FIFO_read_counter is 1 at time t4, write_ready goes high at time t5 and the interleaving of channel a write requests starts at time t6.

When the last read address of the six word block is reached in stage r_a0 at time t4, end_block is signaled (stage r_a0) at time t5. This makes read_ready go low at time t7 (stage r_rdy), and the sending of read requests is finished at t8.

Once the last data word to write is transferred from the FIFO, the FIFO read counter goes to 0 at time t11. This, and the end_block signaled by the w_A0 stage makes the write_ready signal be disasserted at time t11. The last write request interleaved, a6, is aborted and the six word transfer is complete at time t13.

When a request is sent in a channel, the FIFO state counters of this channel must be updated. This is done by interleaving control block 2127 sending the FIFO_write_counter incrementation command (read_req_sent, w_com+) and the FIFO_read_counter decrementation command (write_req_sent, r_com−) to the correct channel.

The current channel at the INTER stage is compared to each possible channel. An update command will be sent only in the channel which matches the current one. If the operation is a read, and if there is an interleaver request at the current stage (irq=1), the correct read req sent is activated. If the operation is a write, and if there is an interleaver request at the current stage (irq=1), the correct write_req_is activated.

An interleaver stall is sent to all the address, end transfer and end element pipelines in all the channels- that aren't currently active at the INTER stage. A signal write_inter stall is sent to the write part of these pipes, and a signal read_inter_stall is sent to the read part. Each pipe receives these commands simultaneously from the four ports. A pipe is stalled only if the four commands it receives are all active.

When a request is acknowledged in a channel, the FIFO state counters of this channel must be updated. This is done, by the acknowledge control block 2132.

Figure 17:
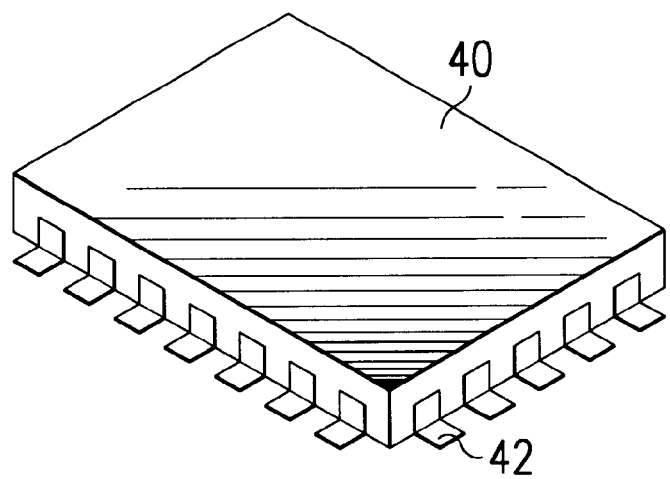
FIG. 17 is a schematic representation of an integrated circuit incorporating the digital system of FIG. 1.

FIG. 17 is a schematic representation of an integrated circuit 40 incorporating processor 100. As shown, the integrated circuit includes a plurality of contacts for surface mounting. However, the integrated circuit could include other configurations, for example a plurality of pins on a lower surface of the circuit for mounting in a zero insertion force socket, or indeed any other suitable configuration.

Figure 18:
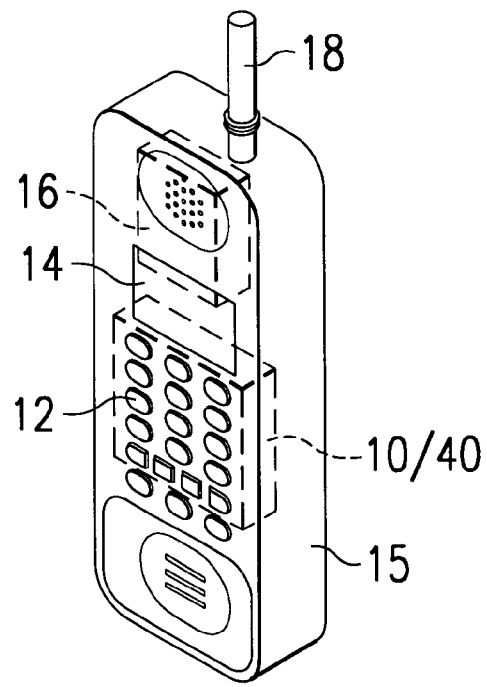
FIG. 18 illustrates an exemplary implementation of an example of such an integrated circuit in a mobile telecommunications device, such as a mobile telephone.

FIG. 18 illustrates an exemplary implementation of an example of such an integrated circuit in a mobile telecommunications device, such as a mobile telephone with integrated keyboard 12 and display 14. As shown in FIG. 18, the digital system 10 included in integrated circuit 40 is connected to the keyboard 12, where appropriate via a keyboard adapter (not shown), to the display 14, where appropriate via a display adapter (not shown) and to radio frequency (RF) circuitry 16. The RF circuitry 16 is connected to an aerial 18.

Referring again to FIG. 4, in an alternative embodiment, ports may be tailored to provide an access protocol required by a different type of resource. Advantageously, channel and scheduling circuitry can interact with various versions of tailored ports without being modified since the channel interface on the port control circuit is the same for all ports. A design library can be provided with a design cell representative of DMA channel controller 400a that is parameterized so that the number of channels to be instantiated in a given ASIC design can be specified. The design library can be provided with design cells for various port controllers that each provide a standard channel interface compatible with interface 470 and that have various memory interfaces. Other port controller cells can be tailored to meet the protocol requirements of a different type of memory resource. The DMA channel controller cell does not need to be modified to interface with the tailored port controllers since the channel interfaces are all compatible.

Fabrication of digital system 10 involves multiple steps of implanting various amounts of impurities into a semiconductor substrate and diffusing the impurities to selected depths within the substrate to form transistor devices. Masks are formed to control the placement of the impurities. Multiple layers of conductive material and insulative material are deposited and etched to interconnect the various devices. These steps are performed in a clean room environment.

A significant portion of the cost of producing the data processing device involves testing. While in wafer form, individual devices are biased to an operational state and probe tested for basic operational functionality. The wafer is then separated into individual dice which may be sold as bare die or packaged. After packaging, finished parts are biased into an operational state and tested for operational functionality.

Digital system 10 contains hardware extensions for advanced debugging features. These assist in the development of an application system. Since these capabilities are part of the core of CPU 200 itself, they are available utilizing only the JTAG interface with extended operating mode extensions. They provide simple, inexpensive, and speed independent access to the core for sophisticated debugging and economical system development, without requiring the costly cabling and access to processor pins required by traditional emulator systems or intruding on system resources.

Thus, a digital system is provided with a multi-channel DMA controller for transferring data between various resources. Parallel channel to port buses are provided for read addresses, write addresses and data outputs from each channel to each port. Parallel port to channel buses are provided for data inputs from each port to each channel. Scheduling circuitry includes request allocator circuitry, interleaver circuitry and mux circuitry and selects one of the channel to port buses to be connected to an associated port controller on each clock cycle for providing an address for a transaction performed on each clock cycle. Each allocator circuit selects a subset of pending requests for an associated port if the total number of requests pending for the port exceed the number of entries in the request allocation table. The interleaver is optimized to provide fair round robin access to the subset of pending requests posted in the request allocation table. The schedulers operate in parallel and source/destination channel address words are transferred in parallel to each scheduler via the parallel channel to port buses. Each port is tailored to provide an access protocol required by its associated resource.

Performance is optimized by the provision of multiple parallel buses so that all of the ports can read or write data from an associated memory resource on the same clock cycle. A new transfer address, which may be either a read address or a write address, can be sent to each port on each clock cycle so that all of the ports can transfer separate streams of data in parallel.

The ports may be tailored in different embodiments to provide an access protocol required by a different type of resource. Channel and scheduling circuitry within a sub-portion of the DMA controller can interact with various versions of tailored ports without being modified.

As used herein, the terms "applied," "connected," and "connection" mean electrically connected, including where additional elements may be in the electrical connection path. "Associated" means a controlling relationship, such as a memory resource that is controlled by an associated port.

While the invention has been described with reference to illustrative embodiments, this description is not intended to be construed in a limiting sense. Various other embodiments of the invention will be apparent to persons skilled in the art upon reference to this description. For example, a digital system may have a single port with multiple requestor circuits connected to a single allocator circuit. In a digital system with a number of ports, a single centralized allocator may manage a single request allocation table for all of the ports, or separate allocation tables for each port. A different number of entries may be provided in the resource allocation table. Other types of priority schemes may be enforced and interleaving may be performed with other than fair round robin scheduling. A different number of channel controllers and/or ports may be implemented. Different numbers and types of requestor circuits may be connected to the allocator circuits, such as DMA channel controllers, one or more microprocessors, a host interface for an external processor, etc. Different types of memory resources may be associated with a port by tailoring the port to match the memory resource.

It is therefore contemplated that the appended claims will cover any such modifications of the embodiments as fall within the true scope and spirit of the invention.

What is claimed is:

1. A digital system, comprising:

a plurality of requestor circuits each having at least one request address output node for providing a request address and at least one request output, at least one of the plurality of requestor circuits comprises address generation circuitry for forming a sequence of request addresses as part of a single request;

a port circuit with a plurality of request address input nodes connected respectively to the request address output nodes of the plurality of requester circuits, a memory address output node for providing a memory address selected from the plurality of request address output nodes, and a scheduler circuit with a plurality of request input nodes connected respectively to the request output of the plurality of requestor circuits operable to select a next request that will be served by the port, wherein after one of the sequence of request addresses from said at least one of the plurality of requestor circuits is selected the port circuitry a next sequential request address is provided to the port circuitry by the at least one requestor and wherein the port circuit is operable to select one of the plurality of request address input nodes for receiving a request address in response to the next request selected by the scheduler circuit; and a memory resource circuit coupled to receive the selected request address from memory address output node of the port circuit.

2. A digital system, comprising:

a plurality of requestor circuits each having at least one request address output node for providing a request address and at least one request output, at least one of the plurality of requestor circuits comprises address generation circuitry for forming a sequence of request addresses as part of a single request;

a port circuit with a plurality of request address input nodes connected respectively to the request address output nodes of the plurality of requestor circuits, a memory address output node for providing a memory address selected from the plurality of request address output nodes to a memory resource, and a scheduler circuit operable to select a next request that will be served by the port, wherein after one of the sequence of request addresses from said at least one of the plurality of requestor circuits is selected by the port circuitry a next sequential request address is provided to the port circuitry A the at least one requestor and wherein the scheduler circuit comprises:

an allocation circuit with a plurality of request inputs each connected to a respective request output on the plurality of requestor circuits, the allocation circuit operable to select a subset of requests from the plurality of request inputs; and an interleaver circuit coupled to the allocation circuit, the interleaver circuit operable to select the next request from among the subset of request signals that will be served next by the port circuit, wherein the port circuit is operable to select one of the plurality of request address input nodes for receiving a request address in response to the next request selected by the interleaver circuit.

3. The digital system according to claim 2, wherein the interleaver circuit comprises a request allocation table memory circuit connected to receive the subset of requests; and wherein the allocation circuit is operable to store the subset of request signals in the request allocation table.

4. The digital system according to claim 3, wherein the interleaver circuit further comprises a plurality of selector circuits with a control input connected to the request allocation table memory circuit, each of the selector circuit having a plurality of status inputs connected to receive a status signal from each requestor circuit and having a selected status output.

5. The digital system according to claim 4, wherein the interleaver circuit further comprises a finite state machine circuit connected to receive a signal from the selected status output of each of the plurality of selector circuits and having a next request output operable to specify the next request that will be serviced by the port circuit.

6. The digital system according to claim 5, further comprising a memory resource circuit directly connected to the memory address output node of the port circuit.

7. The digital system according to claim 5, being a cellular telephone, further comprising:
- a microprocessor controllably connected to at least one of the plurality of requestor circuits;
- an integrated keyboard (12) connected to the microprocessor via a keyboard adapter;
- a display (14), connected to the microprocessor via a display adapter;
- radio frequency (RF) circuitry (16) connected to the microprocessor; and
- an aerial (18) connected to the RF circuitry.

8. A method of operating a digital system having a memory resource and a plurality of requestor circuits which each require access to the memory resource, comprising the steps of:
- receiving a plurality of requests on a respective plurality of buses from the plurality of requestor circuits, at least one of the plurality of requestor circuits comprises address generation circuitry for forming a sequence of request addresses as part of a single request;
- allocating a subset of requests from the plurality of requests and storing the subset of requests in a request allocation table;
- interleaving the subset of requests from the request allocation table to determine the next request that will be presented to the memory resource;
- receiving a next sequential request address from the at least one of the plurality of requestor circuits after one of the sequence of request addresses has been presented to the memory resource.

9. The method of operating a digital system according to claim 8, wherein the step of interleaving comprises interleaving the subset of requests from the request allocation table in a round robin manner.

10. The method of operating a digital system according to claim 9, wherein the step of interleaving comprises evaluating a ready status of each request in the request allocation table and ignoring a request that is not ready.

11. The method of operating a digital system according to claim 10, wherein the step of allocating comprises selecting the subset of requests from the plurality of requestor circuits based on a priority assigned to each requestor circuit; and removing a request by a first requestor from the request allocation table if a request is received from a second requestor having a higher priority than the first requestor.

12. The method of claim 8, wherein the step of allocating comprises ignoring at least one of the plurality of requests not included in the subset of requests until there is an available entry in the allocation table to store the request.

13. The method of claim 12, wherein the step of allocating further comprises selecting the subset of requests from the plurality of requestor circuits based on a priority assigned to each requestor circuit.

14. The method of claim 13, wherein the step of allocating further comprises removing a request by a first requestor from the request allocation table if a request is received from a second requestor having a higher priority than the first requestor.

15. The method of claim 8, further comprising the steps of:
- receiving a plurality of addresses in a parallel manner on a plurality of address busses, such that for each of the plurality of requests there is a corresponding address bus; and
- wherein the step of interleaving comprises selecting a first address bus from the plurality of address buses that corresponds to the next request that will be presented to the memory resource; and
- providing a first address received on the first address bus to the memory resource to initiate a first memory access.

16. The method of claim 15, wherein the step of interleaving is repeated to perform the steps of:
- determining a subsequent request that will be presented to the memory resource;
- selecting a second address bus from the plurality of address buses that corresponds to the subsequent request; and
- providing a second address received on the second address bus to the memory resource to initiate a subsequent memory access.

* * * * *